(12) United States Patent
Aoyama et al.

(10) Patent No.: US 8,582,573 B2
(45) Date of Patent: Nov. 12, 2013

(54) RADIO COMMUNICATION BASE STATION APPARATUS AND RADIO COMMUNICATION METHOD

(75) Inventors: Takahisa Aoyama, Osaka (JP); Akito Fukui, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/590,841

(22) Filed: Aug. 21, 2012

(65) Prior Publication Data

US 2012/0314645 A1   Dec. 13, 2012

Related U.S. Application Data

(63) Continuation of application No. 12/377,373, filed as application No. PCT/JP2007/069985 on Oct. 12, 2007, now Pat. No. 8,270,332.

(30) Foreign Application Priority Data

Oct. 30, 2006 (JP) ................................. 2006-294728
Dec. 21, 2006 (JP) ................................. 2006-344925

(51) Int. Cl.
  *H04L 12/28*   (2006.01)
(52) U.S. Cl.
  USPC ........... 370/390; 370/312; 370/392; 455/502; 455/503
(58) Field of Classification Search
  USPC .................... 370/312, 390, 392; 455/502, 503
  See application file for complete search history.

(56) References Cited

U.S. PATENT DOCUMENTS

| 7,606,226 | B2 | 10/2009 | Yi |
| 2004/0103435 | A1* | 5/2004 | Yi et al. ......................... 725/81 |
| 2004/0202140 | A1 | 10/2004 | Kim |
| 2005/0233732 | A1 | 10/2005 | Kwak |
| 2006/0146858 | A1* | 7/2006 | Kim ............................. 370/432 |
| 2006/0148408 | A1* | 7/2006 | Cho et al. .................... 455/67.7 |
| 2009/0003477 | A1 | 1/2009 | Nishio |

FOREIGN PATENT DOCUMENTS

| JP | 2002-335556 | 11/2002 |
| JP | 2004-312750 | 11/2004 |
| JP | 2005-525065 | 8/2005 |
| JP | 2005-236988 | 9/2005 |
| WO | 2005/043829 | 5/2005 |
| WO | 2005/101881 | 10/2005 |
| WO | 2007/080892 | 7/2007 |

OTHER PUBLICATIONS

International Search Report dated Jan. 15, 2008.

(Continued)

*Primary Examiner* — Un C Cho
*Assistant Examiner* — Siming Liu
(74) *Attorney, Agent, or Firm* — Dickinson Wright PLLC

(57) ABSTRACT

Provided are a wireless communication base station device and a wireless communication method by which overhead is reduced in MBMS of LTE. An MBMS SIB creating section (106) creates an MCCH as an MBMS SIB of notification information, and an MBMS SB creating section (104) creates an MBMS SB, including scheduling information of the MBMS SIB. An MIB creating section (103) creates an MIB, including scheduling information of the MBMS SB, and a transmitting section (107) transmits the created MBMS SIB, MBMS SB AND MIB to a terminal by following the scheduling made by a scheduling section (101).

12 Claims, 25 Drawing Sheets

(56) References Cited

OTHER PUBLICATIONS

3GPP TS 25.346 V6.8.0 (Jun. 2006), Technical Specification, 3rd Generation Partnership Project; Technical Specification Group Radio Access Network; Introduction of the Multimedia Broadcast Multicast Service (MBMS) in the Radio Access Network (RAN); Stage 2, (Release 6), pp. 1-59.

3GPP TS 25.331 V7.1.0 (Jun. 2006), Technical Specification, 3rd Generation Partnership Project; Technical Specification Group Radio Access Network; Radio Resource Control (RRC); Protocol Specification, (Release 7), pp. 1-1272.

Japanese Office Action dated Sep. 13, 2011.

* cited by examiner

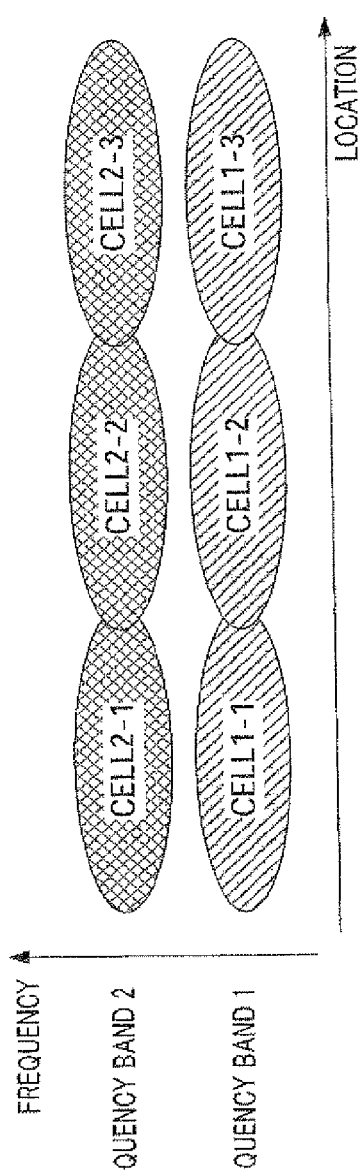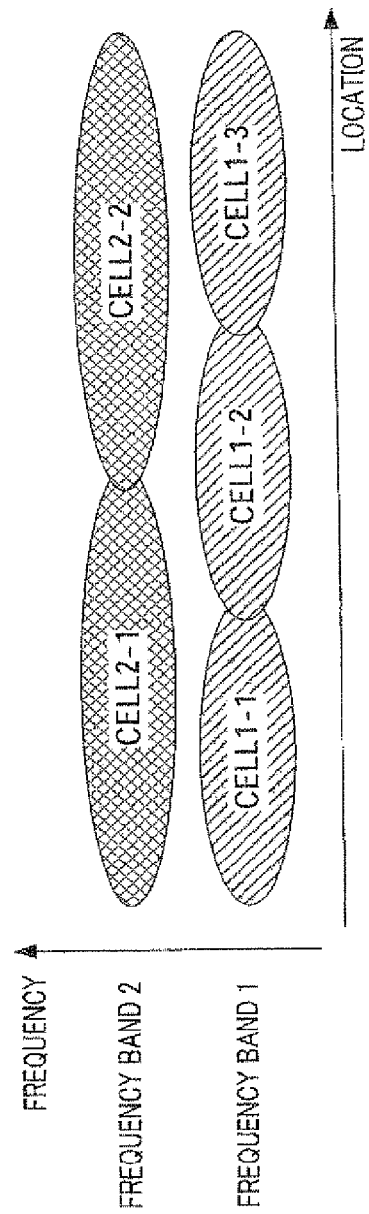

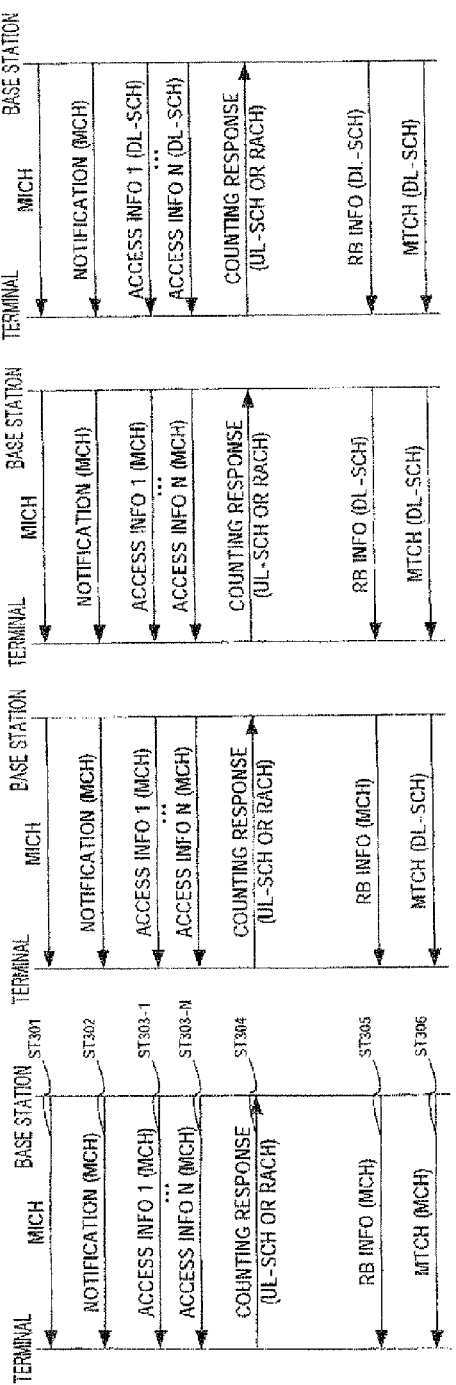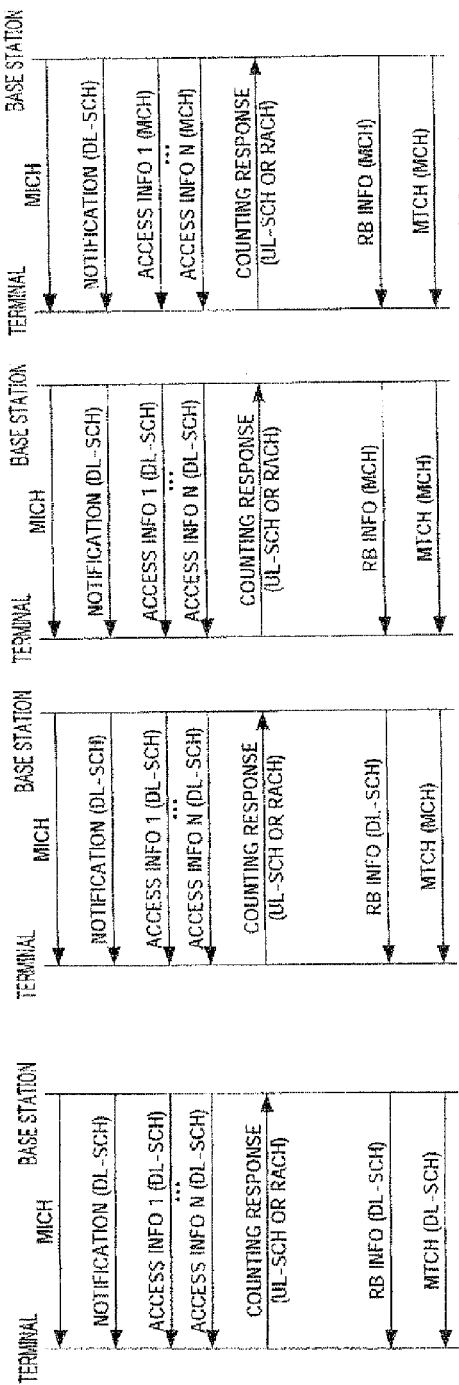

RADIO COMMUNICATION BASE STATION APPARATUS AND RADIO COMMUNICATION METHOD

This is a continuation application of application Ser. No. 12/377,373 filed Feb. 12, 2009, which is a national stage of PCT/JP2007/069985 filed Oct. 12, 2007, which is based on Japanese Application No. 2006-294728 filed Oct. 30, 2006, and Japanese Application No. 2006-344925 filed Dec. 21, 2006, the entire contents of each of which are incorporated by reference herein.

TECHNICAL FIELD

The present invention relates to a radio communication base station apparatus and a radio communication method for carrying out multimedia broadcast multicast service (MBMS) communication.

BACKGROUND ART

In UMTS, MBMS has been introduced in release 6. In services in which a plurality of users require the same information, it is an object of MBMS to allow effective use of radio resources and network resources by transmitting the same information using common channels, rather than transmitting information using a dedicated for every individual user.

First, an outline of MBMS in UMTS will be explained. Non-Patent Document 1 discloses an outline of these behaviors, and Non-Patent Document 2 discloses behaviors in RRC (Radio Resource Control) in detail.

FIG. 1 shows the channels used when MBMS is provided point-to-multipoint in UMTS. This figure also shows the relationships between logical channels, a transport channel and a physical channel. For the logical channels, three of MBMS point-to-multipoint traffic channel (MTCH), MBMS point- to-multipoint control channel (MCCH), and MBMS point-to-multipoint scheduling channel (MSCH) are defined new for MBMS.

Here, the MTCH refers to the channel for transmitting MBMS data and is a data channel. Further, the MCCH refers to the channel including control information for providing MBMS and is a control channel. Furthermore, the MSCH refers to the channel for transmitting MTCH scheduling information and is a control channel.

Next, for the transport channel, a forward access channel (FACH) is used to transmit the three logical channels. The FACH has been present in UTMS and is not a channel defined new for MBMS.

Finally, for the physical channel, a secondary common control physical channel (S-CCPCH) is used to transmit the FACH. The S-CCPCH has also been present in UTMS and is not a channel defined new for MBMS.

Now, layer 2 and layer 3 will be mainly explained below. First, the above-described MCCH will be explained in detail. The MCCH is broadly classified into two categories, that is, "critical" and "non-critical." "Critical" is furthermore divided into three systems, namely notification messages, RB (Radio Bearer) information messages, and general MBMS-related information messages. By contrast with this, "non-critical" refers only to counting messages.

To be more specific, notification messages include "MBMS modified services information" (i.e. message for designating modified service information, including behaviors for terminals after the message) and "MBMS unmodified services information" (i.e. message for designating unmodified service information, including behaviors for terminals after the message).

Further, RB information messages include "MBMS common P-T-M RB information" (including common setups between services in RB information), "MBMS current cell P-T-M RB information" (including setups in cells of terminals in RB information) and "MBMS neighboring cell P-T-M RB information" (including setups in neighboring cells in RB information).

Furthermore, general MBMS-related information messages include "MBMS general information" (including preferred frequency, MBMS timer, counter information, MSCH configuration information and so on).

On the other hand, "non-critical" includes "MBMS access information" (including information related to counting).

By receiving the MCCH messages defined as above and setting up in the terminals, the terminals can receive the MTCHs actually transmitting data and the MSCHs transmitting the MTCH scheduling information.

Next, notification and counting will be explained. In MBMS, services are provided not at all times but are provided either regularly or irregularly. As a specific example, in services such as mobile TV, the same programs (the content changes every time or every several times) are delivered regularly and stock price information is transmitted regularly.

In addition, examples of irregularly provided services include newsflash, which is limited to specific information and which is delivered when news is updated. To support these services, it is necessary to notify terminals that services in which users are interested start to be provided in a network. This behavior is "notification."

"Notification" has broadly two kinds of behaviors. The first behavior refers to checking whether or not services which a terminal requests are provided by checking the above-described notification messages defined by the MCCH by the terminal. The second behavior refers to, by an MBMS indicator channel (MICH), notifying that it is necessary to check the above-described notification messages defined in the MCCH.

In this way, in the "notification," there are a method of checking a notification message by the terminal in one step and a method of checking a notification message by the terminal in two steps.

As described above, whether or not it is necessary to provide a specific service as MBMS in a cell, and, if necessary, how to provide the specific service, are determined by performing counting. Whether or not it is necessary to provide a specific service in a cell is determined by checking whether there are terminals requesting the specific service.

To be more specific, first, the network transmits to terminals a parameter referred to as "probability factor," as information for performing counting for the service to be provided from now on. To prevent channel congestion caused when all terminals requesting the specific service respond, this parameter makes only part of the terminals requesting the specific service respond.

Here, amongst the terminals requesting the specific service, the network identifies a terminal that has responded, so that the network learns that it is necessary to provide the specific service to its cell. If there is no response from terminals, the value of the probability factor is changed to allow more terminals to respond.

The network determines next how to provide the service. For example, in multicast the same information is transmitted to a plurality of terminals, so that it is necessary to transmit information with high power taking into account terminals present at the cell edge. However, if few terminals request a specific service, there are cases where it is better to transmit the same information to each terminal. The network is also required to make determinations about such cases. As a specific example, if there are equal to or more than four terminals, MBMS is provided by multicast, and if there are less than four terminals, MBMS is transmitted individually. In this example, the network checks using counting there are equal to or more than four terminals.

Next, the behaviors until a terminal receives the MCCH will be explained using FIG. 2. As described above, the MCCH is transmitted in a FACH (S-CCPCH corresponding to a physical channel). There are three parameters to show MCCH transmission behaviors, including the modification period, repetition period and access information period. During the modification period, MCCH critical messages cannot be changed and the contents of critical messages, which can be transmitted several times during this period, are all the same. However, non-critical messages can be changed during this period.

Further, the repetition period refers to the intervals in which MCCH critical messages are repeated and the modification period is an integral multiple of the repetition period. Further, the access information period refers to intervals in which MCCH non-critical messages are repeated.

These parameters allow to learn what timing a terminal acquires the MCCH. Other than these parameters, a terminal needs to acquire information about the FACH (S-CCPCH corresponding to a physical channel), whereby the MCCH is transmitted. These channel information and information related to MCCH transmission interval are transmitted in an SIB 5 as broadcast information. That is, by receiving the SIB 5, a terminal is allowed to receive the MCCH. To receive the SIB 5, a terminal needs to SIB scheduling information and acquires scheduling information included in a MIB. This is a general broadcast information acquiring behavior.

As such, many behaviors are defined new in MBMS of UMTS release 6, and therefore MBMS of UMTS release 6 is a very complicated system.

Non-patent Document 1: 3GPP TS25.346 V6.8.0 "Introduction of the Multimedia Broadcast Multicast Service in the Radio Access Network"

Non-patent Document 2: 3GPP TS25.331 V7.1.0 "Radio Resource Control"

DISCLOSURE OF INVENTION

Problems to be Solved by the Invention

Although MBMS is adopted from the beginning of the system development and proposed to design new functions and a new framework for MBMS in various documents in LTE (Long Term Evolution), there is a problem of increasing overhead.

It is therefore an object of the present invention to provide a radio communication base station apparatus and radio communication method for reducing overhead in MBMS of LTE.

Means for Solving the Problem

The radio communication base station apparatus of the present invention adopts a configuration including: a multimedia broadcast multicast service (MBMS) system information block (SIB) creating section that creates control information for an MBMS as an MBMS SIB of broadcast information, and the broadcast information comprises a SIB; a multimedia broadcast multicast service scheduling block (MBMS SB) creating section that creates a scheduling block (SB) for scheduling information of the MBMS control information; a master information block (MIB) creating section that creates an MIB including scheduling information in the MBMS SB; and a transmitting section that transmits the created MBMS SIB, MBMS SB and MIB.

The radio communication method of the present invention includes steps of: creating control information for an MBMS as an MBMS SIB of broadcast information, and the broadcast information comprises a SIB; creating an MBMS SB for scheduling information of the MBMS control information; creating MIB for the MBMS including scheduling information of the control information; and transmitting the created MBMS SIB, MBMS SB and MIB.

Advantageous Effect of the Invention

The present invention provides an advantage of reducing overhead in MBMS of LTE.

BRIEF DESCRIPTION OF DRAWINGS

FIG. 7 illustrates how a plurality of frequency bands are used for MBMS;
FIG. 14 shows an example of the procedure, namely MBMS control steps.

BEST MODE FOR CARRYING OUT THE INVENTION

Figure 1:
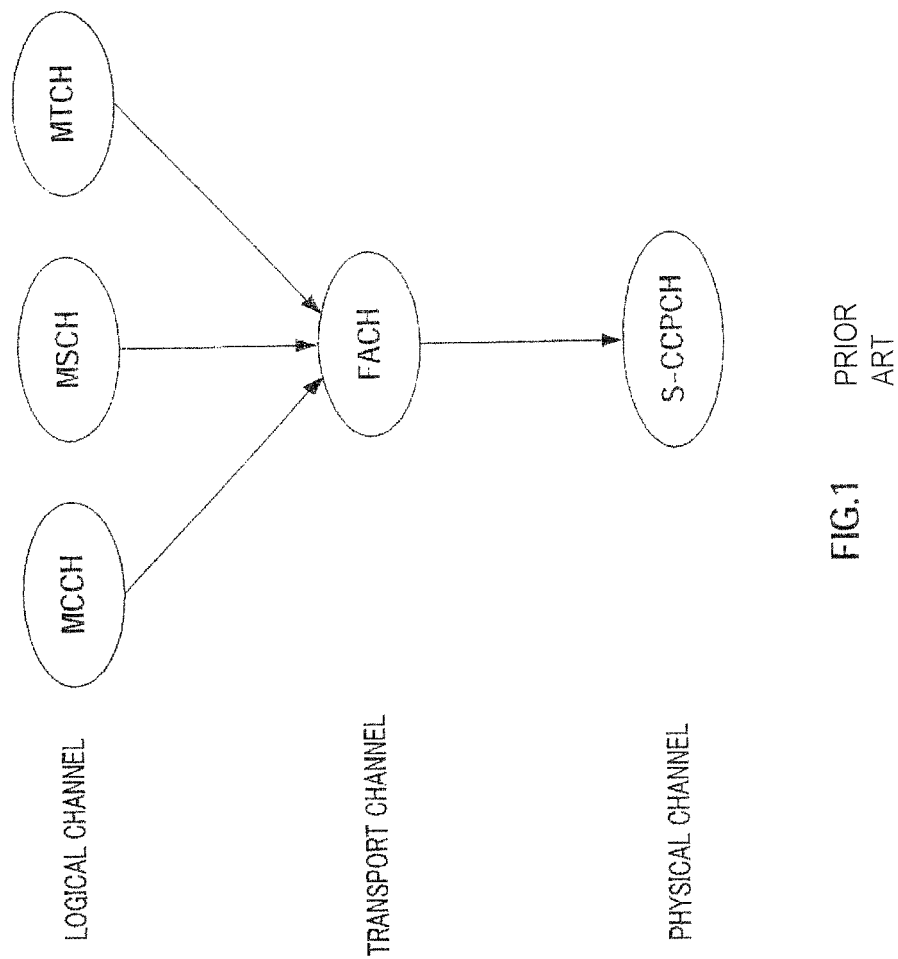
FIG. 1 shows channels used in UMTS.
Figure 2:
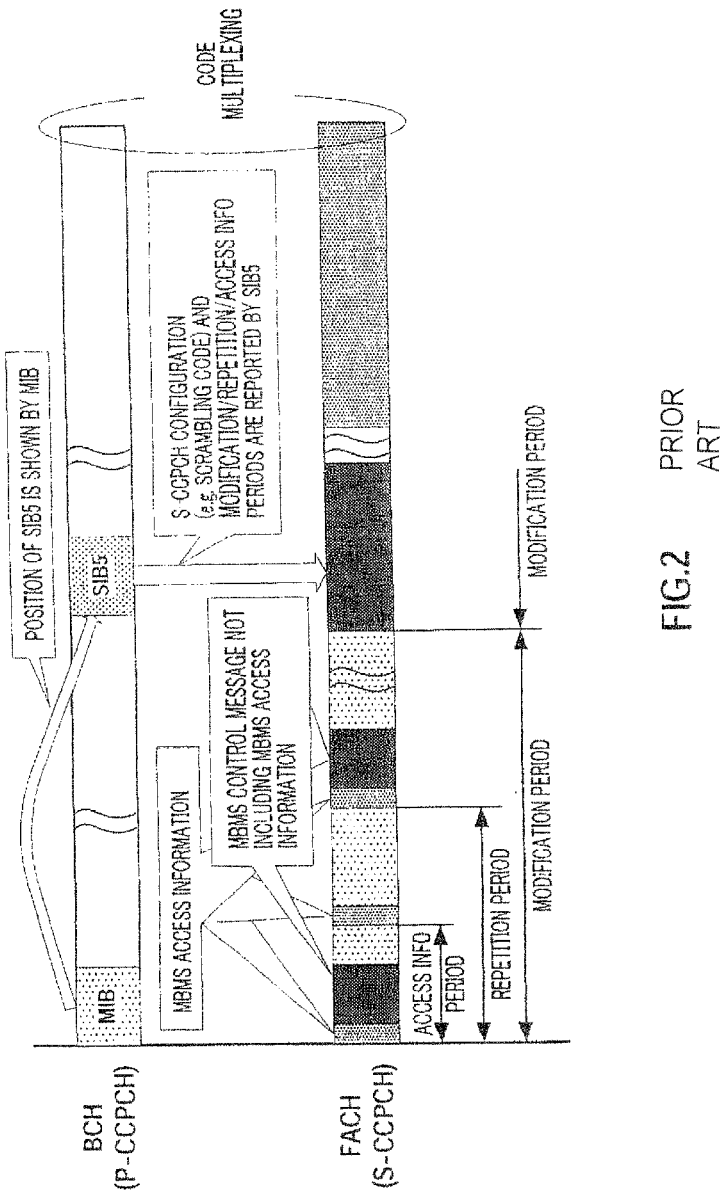
FIG. 2 explains the behaviors until a terminal receives an MCCH.

Now, embodiments of the present invention will be described in detail with reference to the accompanying drawings. Further, in embodiments, the components having the same functions will be assigned the same reference numerals and overlapping descriptions thereof will be omitted.

(Embodiment 1)

Figure 3:
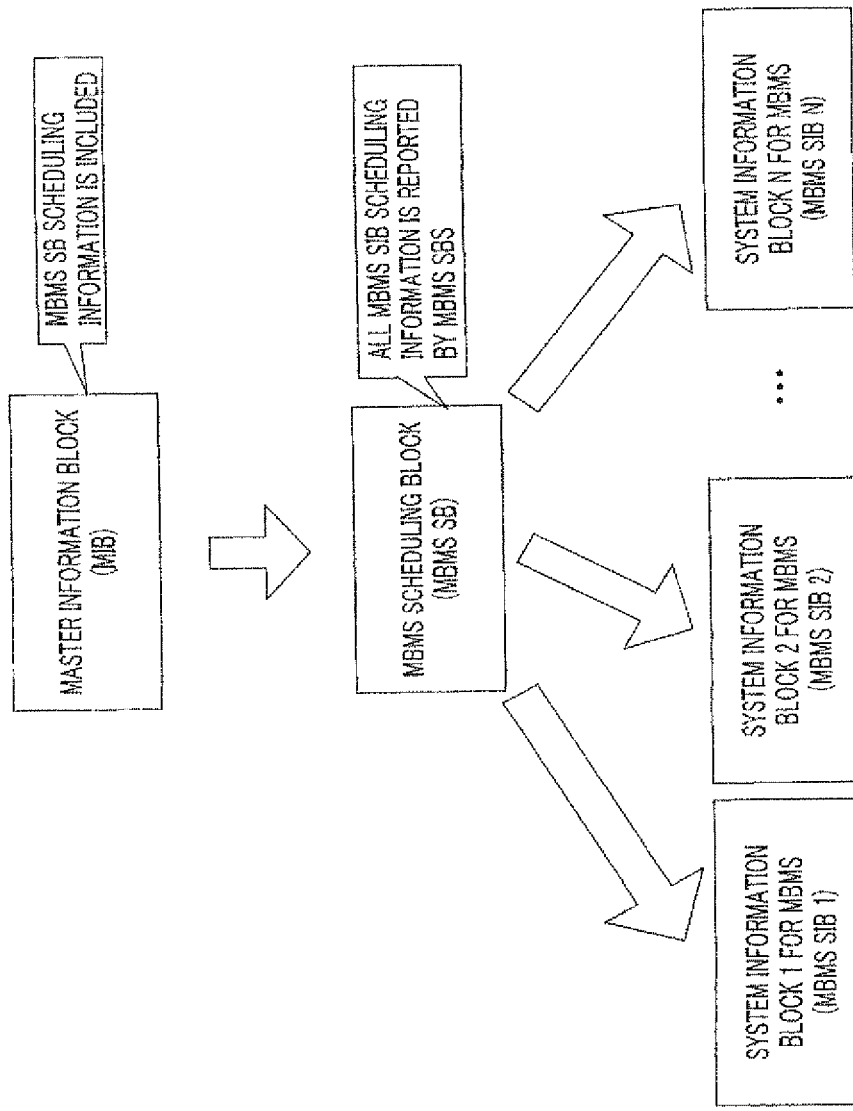
FIG. 3 shows the relationships between an MIB, an MBMS SB and MBMS SIBs according to Embodiment 1 of the present invention.

FIG. 3 shows the relationships between the MIBs, MBMS SB and MBMS SIBs according to Embodiment 1 of the present invention. Although, in UMTS, a plurality of messages classified in the MCCH are transmitted in the format of broadcast information, that is, indifferent system from system information blocks (SIBs), as shown in FIG. 3, defined as the SIBs for MBMS (hereinafter "MBMS SIBs"). The SIBs may be in message units in the MCCH of UTMS. For example, one SIB for transmitting information corresponding to MBMS modified services information may be defined, and another SIB for transmitting information corresponding to MBMS unmodified services information may be defined. The method of allocating SIBs is not limited to the above method, and other methods may be also applicable.

The MBMS SIBs defined as such are scheduled by scheduling blocks for MBMS (hereinafter "MBMS SB") including scheduling information on MBMS SIBs. The scheduling information includes transmission timings (i.e. positions on system frame number) and transmission intervals defined in broadcast information transmission in UMTS, and, although other information such as radio blocks may be required, any information may be applied.

The MBMS SBs are scheduled by master information blocks ("MIBs") as same as normal SBs. With these behaviors, in UTMS, it is possible to replace other functions required to receive MCCHs of MBMS with functions used for broadcast information. To be more specific, the repetition period and access information period defined in UMTS can be defined by the MBMS SIB transmission intervals. This is the same information used in usual SIB transmissions.

Figure 4:
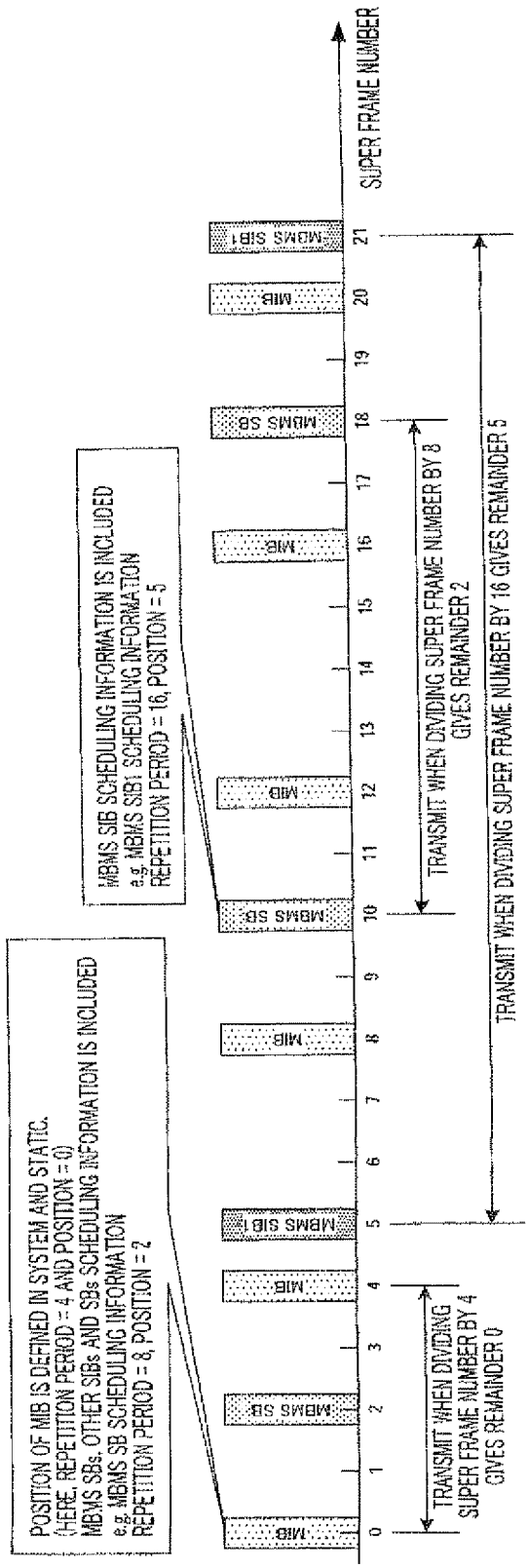
FIG. 4 shows transmission intervals and transmission timings of the MIBs, the MBMS SBs and the MBMS SIBs shown in FIG. 3.

This will be explained using FIG. 4. In this figure, the transmission interval (i.e. repetition period) of the MIB is four, and the transmission timings (i.e. position) are zero. This is the same as the definition in UTMS. In this case, the MIB is transmitted at the timing dividing the super frame number by four gives a remainder of zero. Here, the eight transmission intervals (repetition periods) and the two transmission timings (position) are stored in the MIB as the MBMS SB scheduling information, so that the MBMS SB is transmitted at the timing dividing the super frame number by eight gives a remainder of two. Similarly, based on the SIB scheduling information stored in the MBMS SB, the transmission interval and transmission timings for the SIBs are determined.

Figure 5:
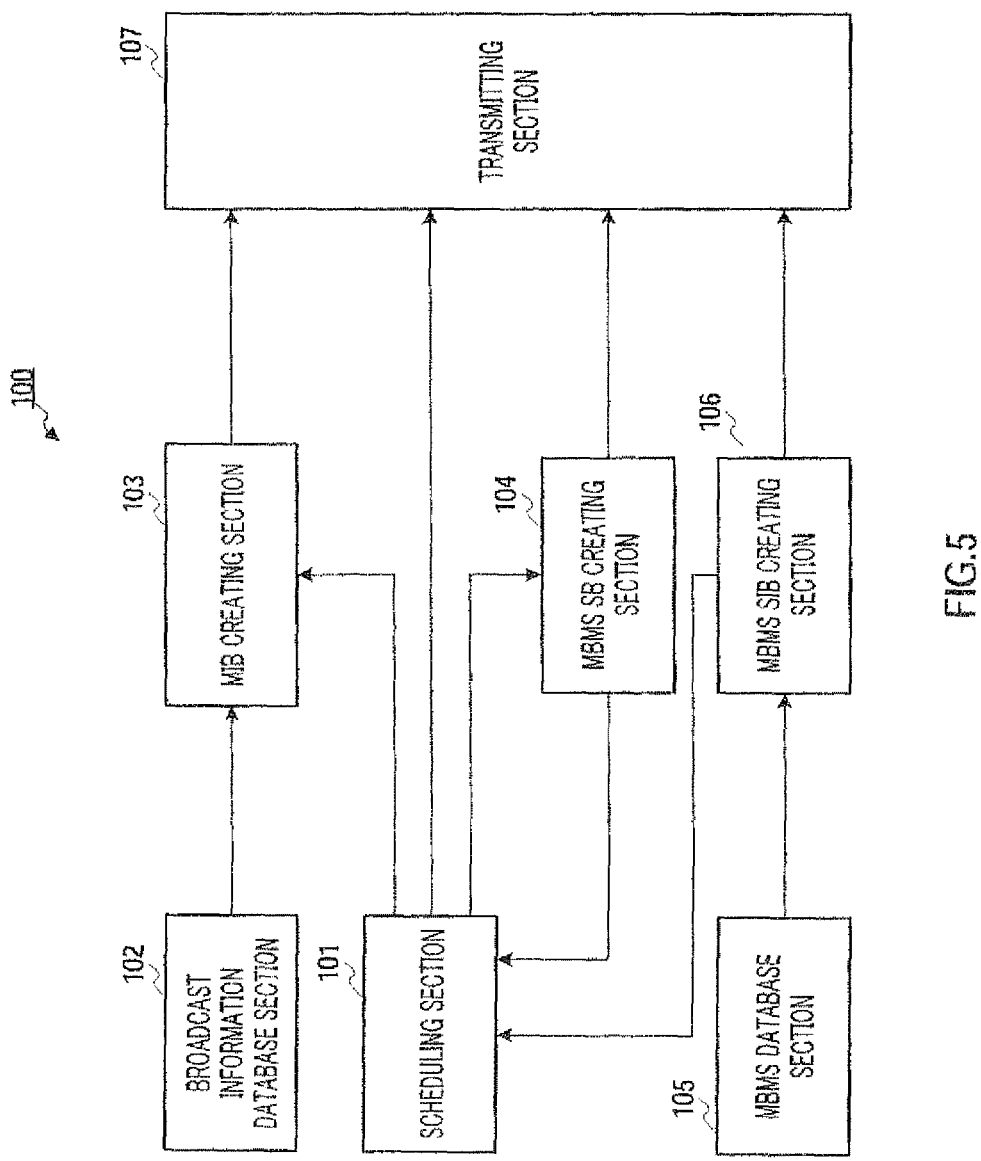
FIG. 5 is a block diagram showing the configuration of base station apparatus according to Embodiment 1 of the present invention.

Hereinafter, the configuration of base station apparatus 100 according to Embodiment 1 of the present invention will be explained using FIG. 5. Scheduling section 101 acquires MBMS SIB types and the data sizes of individual MBMS SIB types from MBMS SIB creating section 106 (described later), and determines MBMS SIB scheduling information based on these. Further, scheduling section 101 acquires information including the data sizes of the MBMS SB created from MBMS SB creating section 104 (described later), and determines MBMS SB scheduling information based on this information. The determined MBMS SIB scheduling information is outputted to MBMS SB creating section 104, and the MBMS SB scheduling information is outputted to MIB creating section 103. Further, these pieces of scheduling information are outputted to transmitting section 107.

Broadcast information database section 102 memorizes the information related to MIBs in broadcast information, and outputs the memorized MIB-related information to MIB creating section 103.

MIB creating section 103 forms an MIB from the MBMS SB scheduling information outputted from scheduling section 101 and the MIB-related information outputted from broadcast information database section 102, and outputs the created MIB to transmitting section 107.

MBMS SB creating section 104 creates an MBMS SB based on the MBMS SIB scheduling information outputted from scheduling section 101, and outputs the created MBMS SB to transmitting section 107. Further, information including the created MBMS SB data sizes is outputted to scheduling section 101.

MBMS database section 105 memorizes service information to be provided as MBMS and setup information required to provide this service, and outputs these pieces of memorized information to MBMS SIB creating section 106.

MBMS SIB creating section 106 creates an MBMS SIB based on the service information and setup information outputted from MBMS database section 105, and outputs the created MBMS SIB to transmitting section 107. Further, the created MBMS SIB types and data sizes are outputted to scheduling section 101.

Transmitting section 107 transmits the MIBs outputted from MIB creating section 103, the MBMS SBs outputted from MBMS SB creating section 104 and the MBMS SIBs outputted from MBMS SIB creating section 106, according to scheduling information outputted from scheduling section 101.

Base station apparatus 100 having such a configuration makes it possible to transmit the MBMS SIBs and usual broadcast information in the same way. Further, in UMTS, the same repetition period is required to be used in critical information, and there is no way of knowing in what order MCCH messages are aligned, until reception. However, the above-described method makes it possible to change a rate of occurring transmission per MBMS SIB and report the transmission timing per MBMS SIB, so that more flexible behaviors are possible.

In the modification period, it is also possible to use the value tags used in broadcast information in UMTS. That is, the period not changed such as the modification period is not defined, but whether or not content has been changed is reported by value tags, so that whether or not there is change can be detected in terminals.

These value tags may not be individually operated between all terminals but may be updated at the same time between related MBMS SIBs. To be more specific, it is possible that the pieces of information related to notification are a set, and therefore there is a method of incrementing both the value tags for SIBs for transmitting information corresponding to MBMS modified services information and the value tags for SIBs for transmitting information corresponding to MBMS unmodified services information. Further, for an atypical operation, for SIBs for transmitting information corresponding to messages defined to be critical in UMTS, a method of incrementing all value tags alike is also possible.

These value tags may also have different ranges of values from the value tags for transmitting other broadcast information. To be more specific, upon transmitting broadcast information, a plurality of kinds of value tags are prepared in UMTS, including the value tag for predefined configuration, the value tag for cell level information, and the value tag for PLMN level information. Similar to this, it is possible to provide value tags for MBMS SIB.

In this way, according to Embodiment 1, by creating an MCCH as an MBMS SIB of broadcast information, creating an MBMS SB including scheduling information for the MBMS SIB, creating an MIB including scheduling information for the MBMS SB and transmitting these pieces of created information to terminals, it is possible to transmit MBMS SIBs and usual broadcast information alike, thereby reducing overhead.

With the present embodiment, although a method of detecting changes using value tags instead of the modification period has been explained, it is also possible to use the concept of the modification period. To be more specific, information during the modification period are included in an MBMS SB or MIB, which is reported to terminals. At this time, the point to start the modification period may include the point where a modulo of the system frame number using a specific value is zero, and may be an MBMS SB as the point. Further, the modification period interval may be an integral multiple of the MBMS SIB transmission interval and may be defined as an integral multiple of the MBMS SB transmission interval.

Further, although the MBMS SB has been defined with the present embodiment, it is also possible as an operation to include the entire content of the MBMS SB in the MIB. In such a case, scheduling of the MBMS SIBs is performed directly from the MIBs.

Further, as MBMS SBs, normal SB may be used such that MBMS-related SIBs alone are not included, and other SIBs are included.

In LTE, upon transmitting broadcast information, the broadcast information is defined as the part to be transmitted in fixed resources and as the part to be transmitted in flexible resources. Here, the fixed resources refer to fixed timings in the central 1.25 MHz band shown in FIG. 6. Further, the flexible resources refer to the central 10-MHz band. In this case, there are several possible patterns how MIBs, MBMS SBs and MBMS SIBs are transmitted.

Figure 6:
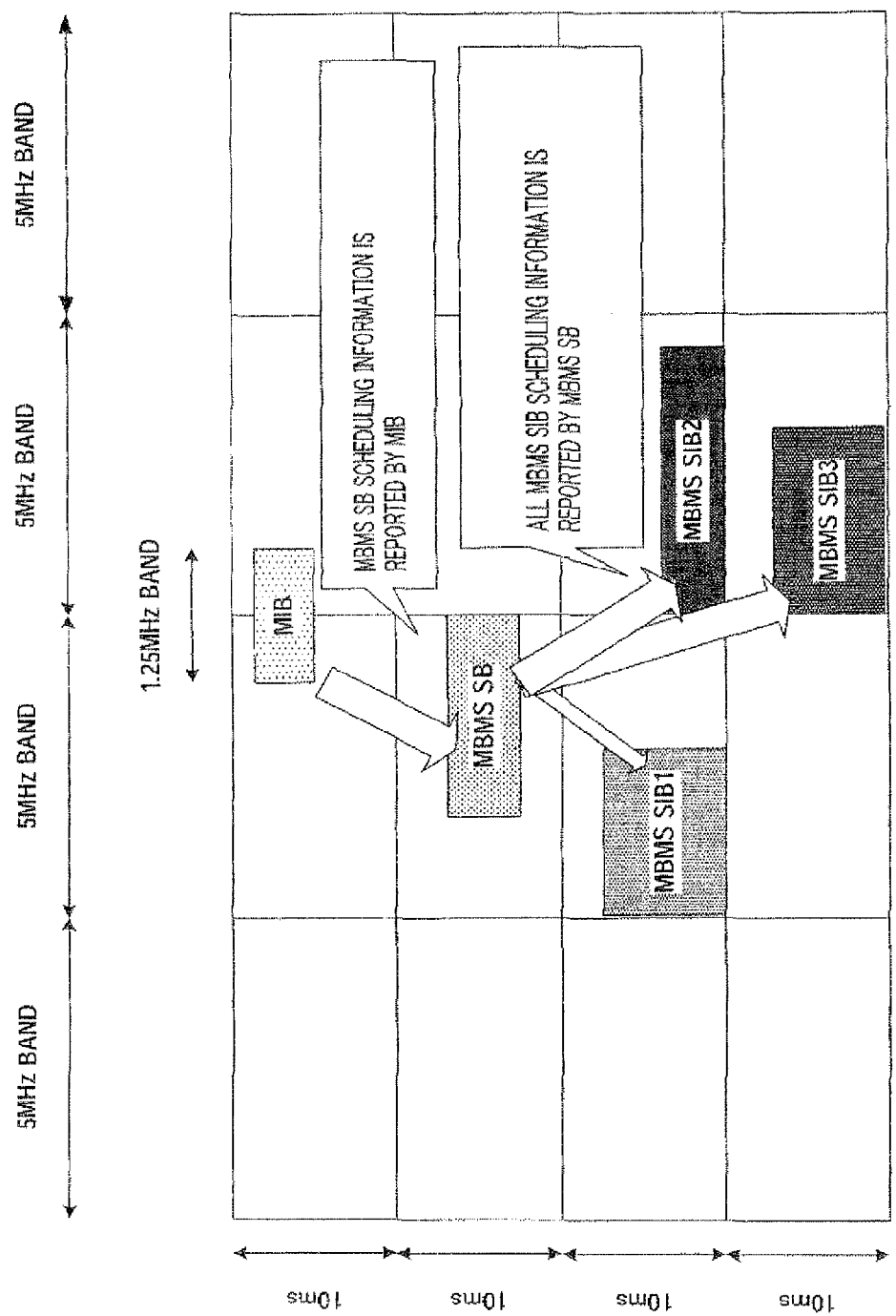
FIG. 6 shows fixed resources and flexible resources where broadcast information is transmitted.

MIBs need to be transmitted in the fixed resources such that terminals can receive MIBs using fixed information. On the other hand, MBMS SBs and MBMS SIBs may be transmitted in the flexible resources. For that reason, as shown in FIG. 6, it is possible to transmit the MIBs alone using the fixed resources and transmit the MBMS SBs and MBMS SIBs in the flexible resources. However, as described above, the MBMS SBs can be included in the MIBs and can be transmitted in the fixed resources. Further, the MBMS SIBs may also be transmitted using the fixed resources.

Further, it is possible to use a plurality of frequency bands for MBMS. FIG. 7 shows this situation. Here, FIG. 7A shows an example of forming cells covering the same areas in a plurality of frequency bands, and FIG. 7B shows an example of forming cells covering different areas in a plurality of frequency bands.

Figure 8A:
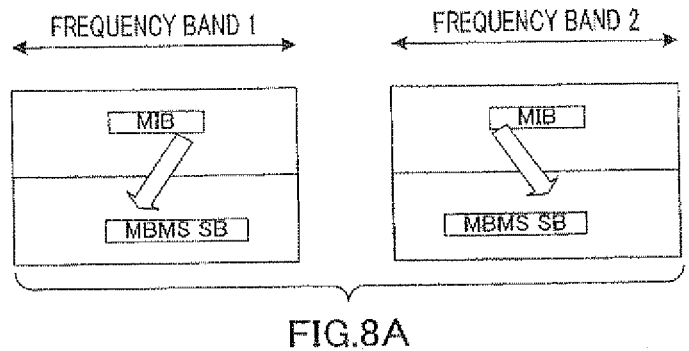
FIG. 8 shows the MBMS SB transmission method shown in FIG. 7A.
Figure 8B:
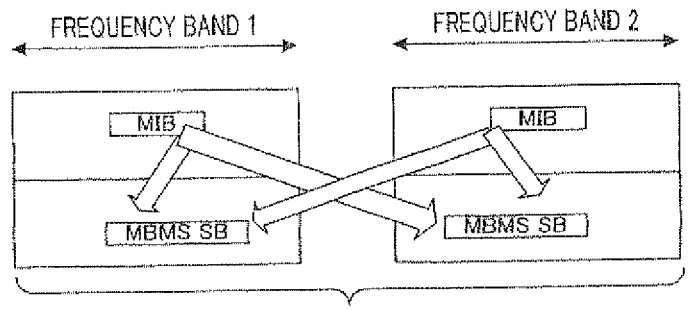
Figure 8C:
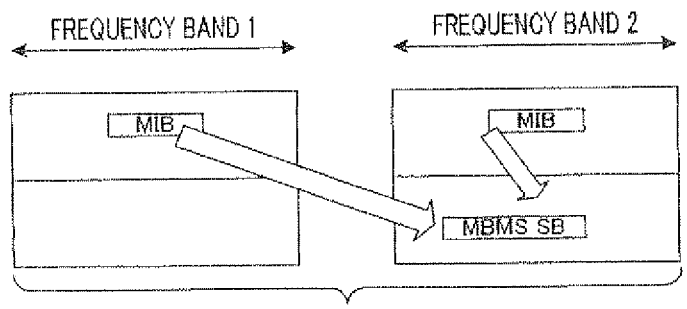
Figure 8D:
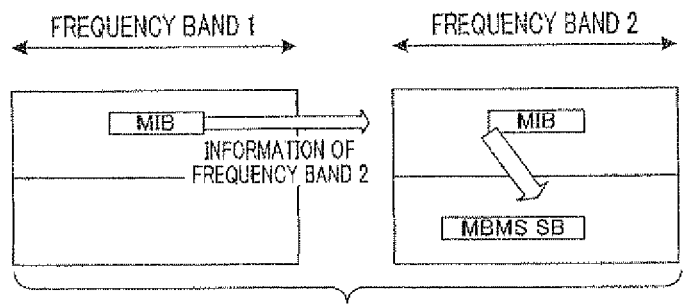

First, the example shown in FIG. 7A will be discussed. In this case, there are four possible patterns of MBMS SB transmission methods, as shown in FIGS. 8A to 8D. FIG. 8A shows a case where MBMS is provided in a plurality of frequency bands and where the MBMS SB information in the frequency bands is transmitted in its frequency bands, respectively. FIG. 8B shows a case where MBMS is provided in a plurality of frequency bands and where the MBMS SB information in the frequency bands and the MBMS SB information in other frequency bands are transmitted in their frequency bands. FIG. 8C shows a case where MBMS is provided in a specific frequency band and the MBMS SB information in the frequency band in which MBMS is provided is transmitted in the frequency bands. FIG. 8D shows a case where MBMS is provided in a specific frequency band, where MBMS SB information is provided in the frequency band in which MBMS is provided, and where, in other frequency bands, only the information in the frequency band in which MBMS is provided is transmitted. Any methods shown in FIGS. 8A to 8D are available in the present embodiment.

Figure 9A:
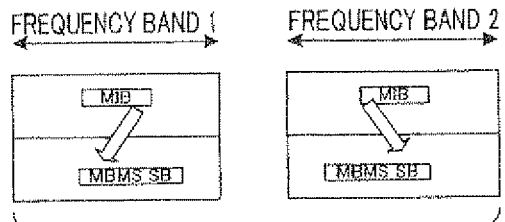
FIG. 9 shows the MBMS SB transmission method shown in FIG. 7B.
Figure 9B:
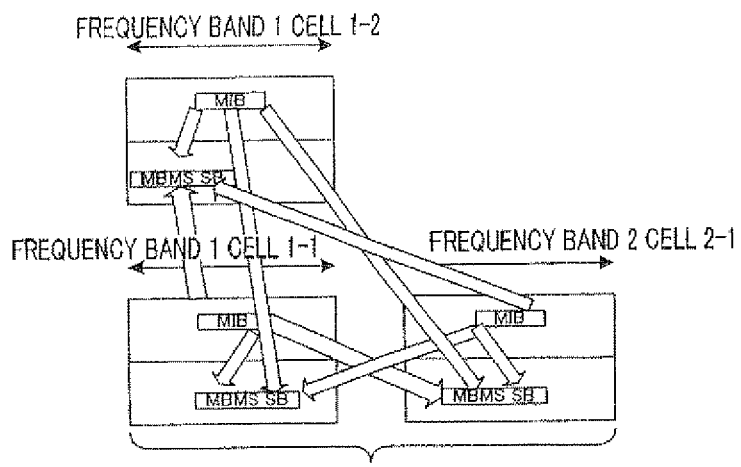
Figure 9C:
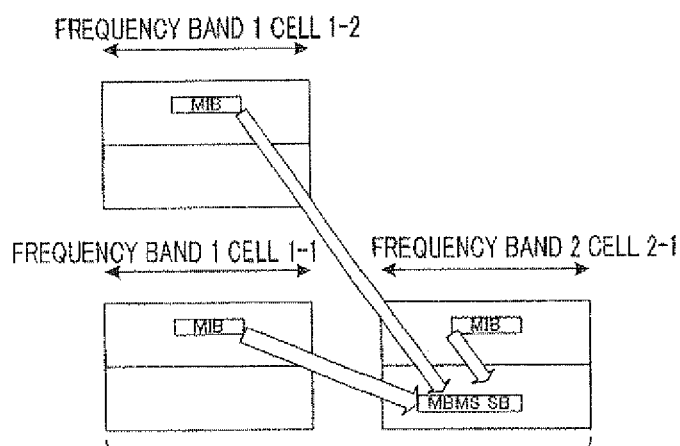
Figure 9D:
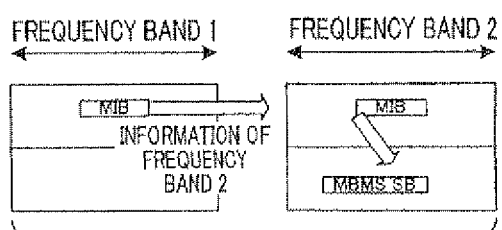

Next, the example shown in FIG. 7B will be discussed. In this case, there are four possible patterns of MBMS SB transmission methods, as shown in FIGS. 9A to 9D. Further, FIGS. 9A to 9D each show the same behaviors as in FIGS. 8A to 8D. However, areas of cells are different between frequency bands, so that, a case where a plurality of cells represent identical cells in other frequency bands and in contrast a case where one cell represents a plurality of cells in other frequency bands, are possible That is, the area where MBMS is provided and the area where normal services are provided are different, and therefore cases occur where a plurality of cells represent one cell (FIGS. 9B and 9C).

Figure 10A:
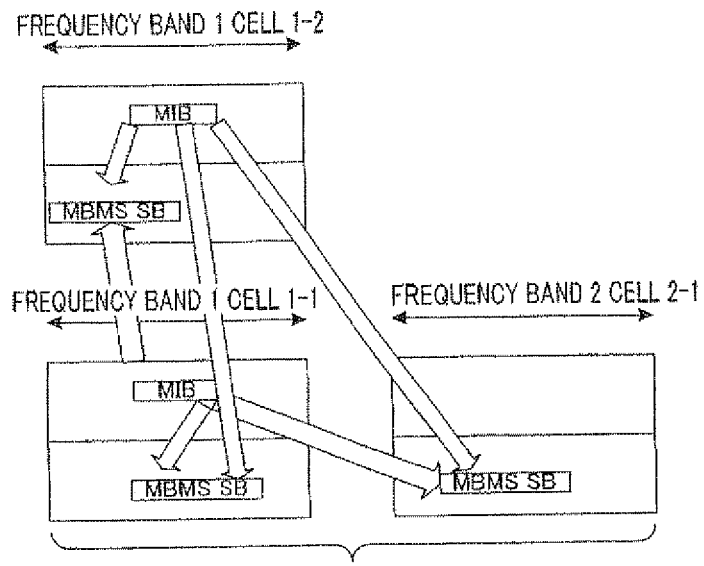
FIG. 10 shows the MBMS SB transmission method using MBMS dedicated cell.
Figure 10B:
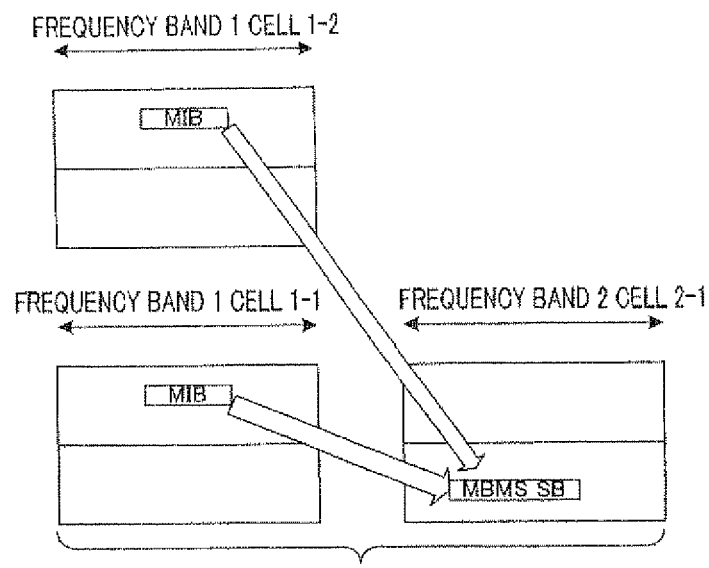

Further, in LTE, providing MBMS-dedicated frequency bands is discussed. These are referred to as "MBMS-dedicated cells" or "MBMS dedicated layers," for example. In these cells, MIBs may not be transmitted as in normal cells. In this case, two cases are possible as shown in FIGS. 10A and 10B. FIG. 10A shows a case where MBMS is provided in a plurality of frequency bands including the MBMS-dedicated cell and where the MBMS SB information in the frequency bands and the MBMS SB information in the MBMS-dedicated cell are transmitted in cells other than the MBMS-dedicated cell. FIG. 10B shows a case where MBMS is provided only in an MBMS-dedicated cell and where MBMS SB information is transmitted in cells other than the MBMS-dedicated cell.

Given these behaviors, it is possible to support operations using different frequency bands and support operations using an MBMS-dedicated cell.

When MBMS is transmitted in a plurality of frequency bands, it is possible to make MBMS SB scheduling information common between frequencies. That is, it is possible to make information included in MIBs to show the location of the MBMS SB of a frequency band common between all frequency bands. By this means, it is possible to reduce the information for showing the MBMS SB.

(Embodiment 2)

SFN (Single Frequency Network) operation is studied in MBMS in LTE (Long Term Evolution). SFN operation refers to functions of combining signals over the radio by transmitting identical information at the same timings in the same frequency bands from a plurality of base stations. This SFN operation makes it possible to significantly improve received quality of terminals located at cell edge.

However, this SFN operation presumes adopting identical information in a plurality of base stations and does not apply to information that is transmitted only in a specific base station. This case is referred to as "non-SFN operation."

Features of SFN operation include combining signals between base stations as described above, and, to realize this feature, it is necessary to use longer cyclic prefixes than in normal communication in a cell. The reason is that combining signals from a plurality of base stations takes a longer time period than combining signals from one base station. Based on these matters, data is transmitted in different formats between a case of performing SFN operation and a case of performing non-SFN operation.

In LTE, a multicast channel (MCH) is prepared as the transport channel supporting SFN operation, and a downlink shared channel (DL-SCH) is prepared as the transport channel for normal transmission. For that reason, information for SFN operation is transmitted in MCHs and information for non-SFN operation is transmitted in DL-SCHs.

As described above, the MCH and the DL-SCH having different formats cannot be transmitted in the identical timing in the same frequency band and are needed to transmit at the different timings. That is, MBMS data in SFN operation and MBMS data in non-SFN operation are transmitted at different timings. The same also applies to the control information (MCCH), not only for the data itself. That is, SFN operation is performed on MBMS data to be subjected to SFN operation, and non-SFN operation is performed on MBMS data to be subjected to non-SFN operations.

Figure 11:
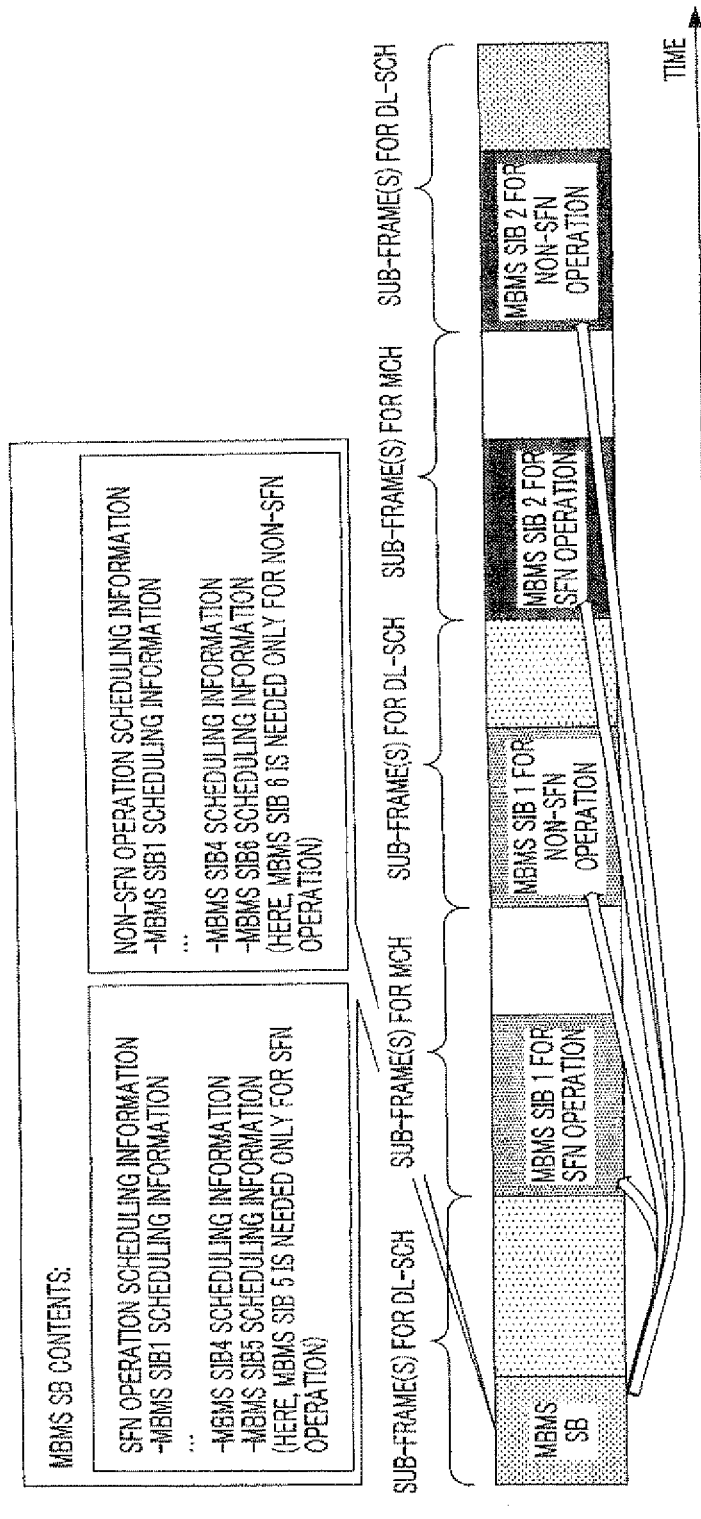
FIG. 11 shows a subframe arrangement example.

Here, FIG. 11 shows an arrangement example of the subframes. Referring to FIG. 11, in the MBMS SBs, the SIBs for SFN operation and the SIBs for non-SFN operation are scheduled separately. This is because one SIB is needed to be transmitted at different timings, for SFN operation and for non-SFN operation. This scheduling makes it possible to provide SFN operation and non-SFN operation also for MCCHs.

Figure 12:
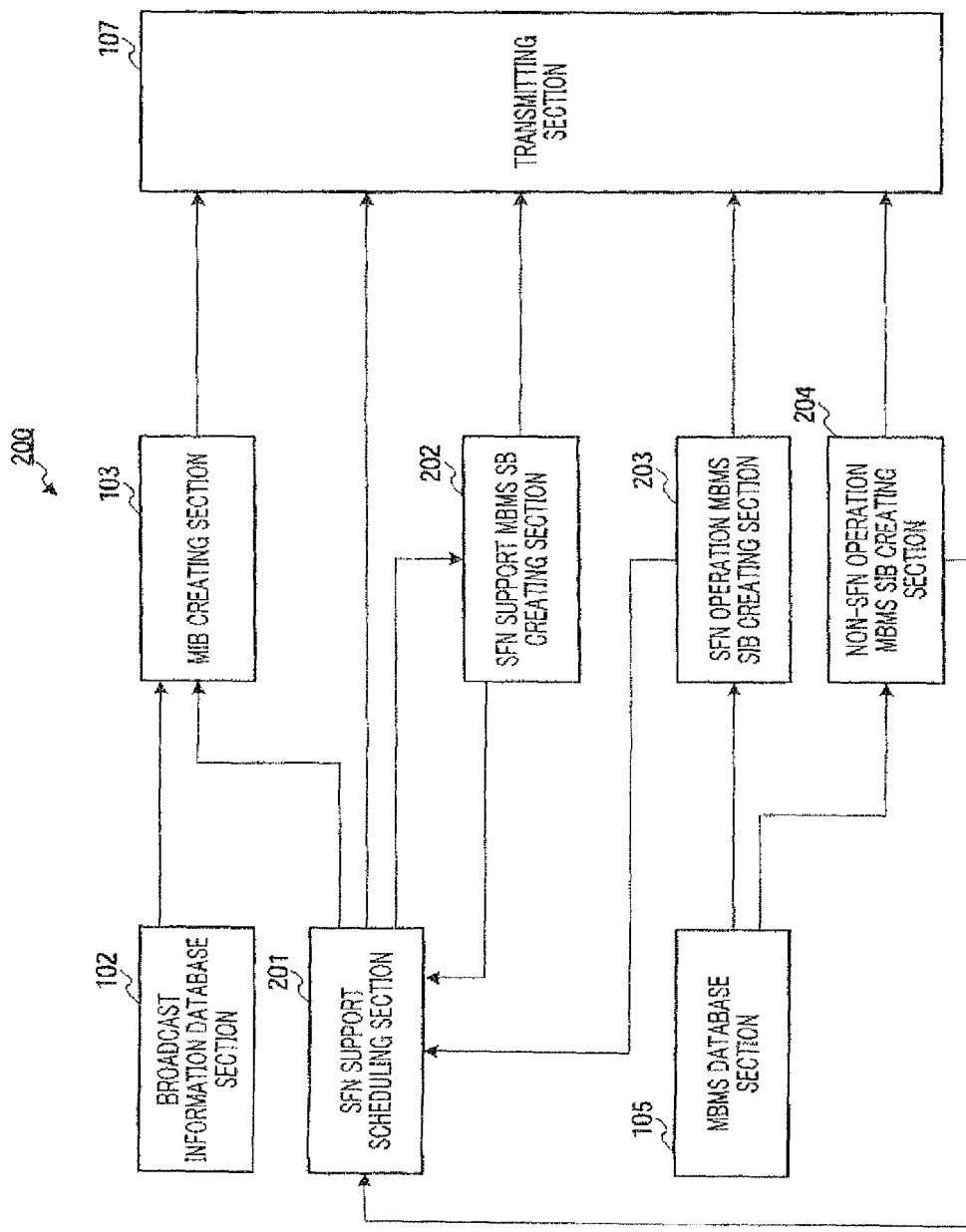
FIG. 12 is a block diagram showing the configuration of base station apparatus according to Embodiment 2 of the present invention.

Hereinafter, the configuration of base station apparatus 200 according to Embodiment 2 of the present invention will be explained using FIG. 12. SFN support scheduling section 201 acquires MBMS SIB types and the data sizes for SFN operation, from SFN operation MBMS SIB creating section 203 (described later). Further, SFN support scheduling section 201 acquires MBMS SIB types and the data sizes for non-SFN operation, from non-SFN operation MBMS SIB creating section 204 (described later). SFN support scheduling section 201 determines MBMS SIB scheduling information based on this acquired information. The determined MBMS SIB scheduling information is outputted to MBMS SB creating section 202. At this time, SFN support scheduling section 201 sets up such that MBMS SIBs for SFN operation can be transmitted at the timings when SFN operation can be performed and sets up such that MBMS SIBs for non-SFN operation can be transmitted at the timings when SFN operation is not performed. SFN support scheduling section 201 has information whether or not SFN operation can be performed.

SFN support MBMS SB creating section 202 creates MBMS SBs where scheduling information for SFN operation and scheduling information, for non-SFN operation are separated, using the MBMS SIB scheduling information outputted from SFN support scheduling section 201. The created MBMS SBs are outputted to transmitting section 107. Further, information including the data sizes of the created MBMS SB is outputted to SFN support scheduling section 201.

SFN operation MBMS SIB creating section 203 creates an MBMS SIB for SFN operation based on the service information and setup information outputted from MBMS database section 105, and outputs the created MBMS SIB for SFN operation to transmitting section 107. Further, the created MBMS SIB types and data sizes for SFN operation are outputted to SFN support scheduling section 201.

Non-SFN operation MBMS SIB creating section 204 creates an MBMS SIB for non-SFN operation based on the service information and setup information outputted from MBMS database section 105, and outputs the created MBMS SIB for non-SFN operation to transmitting section 107. Further, the created MBMS SIB types and data sizes for non-SFN operation are outputted to SFN support scheduling section 201.

In this way, according to Embodiment 2, by separately scheduling MBMS SIBs for MBMS data for SFN operation and MBMS SIBs for MBMS data for non-SFN operation, it is possible to transmit MBMS control information supporting SFN operation.

Although a case has been explained with the present embodiment where one MBMS SB includes both SIB scheduling information for SFN operation and SIB scheduling information for non-SFN operation, it is equally possible to define MBMS SBs as MBMS SBs for SFN operation and MBMS SBs for non-SFN operation. Further, if the SB includes a general SB, not an MBMS SB, which is an MBMS-dedicated SIB, it is equally possible to define the SB as the SB for SIBs performing SFN operation and as the SB for SIBs performing non-SFN operation.

(Embodiment 3)

Although a case has been explained with Embodiment 2 where SFN operation is performed for control information of MBMS data for SFN operation (i.e. MCCH) and non-SFN operation is performed for control information of MBMS data for non-SFN operation (i.e. MCCH), it is possible that whether to perform SFN operation or non-SFN operation changes in the middle of the MBMS controlling steps.

Figure 13:
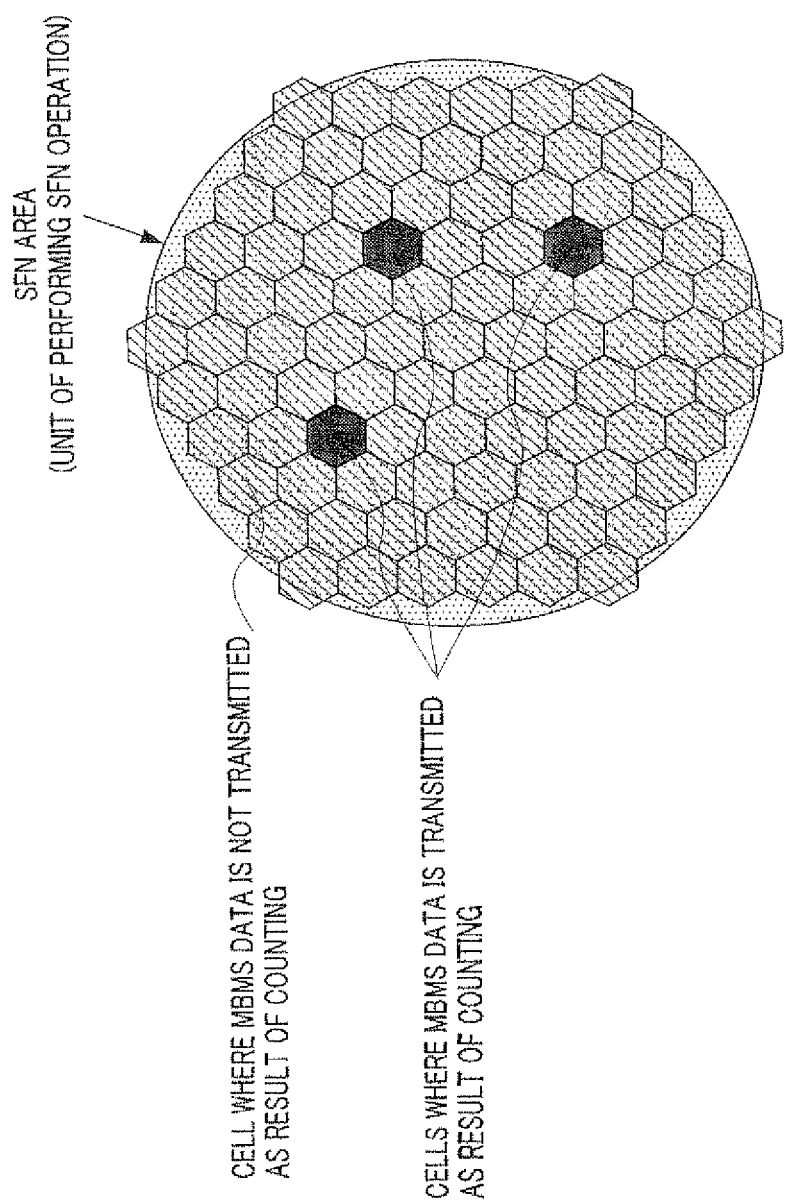
FIG. 13 illustrates a situation where terminals requesting specific MBMS data are concentrated on specific cells.

To be more specific, a case will be assumed where there are a small number of terminals requesting specific MBMS data and these terminals concentrate in specific cells. In this case, it is more efficient to perform non-SFN operation and transmit MBMS data in the cells where there are terminals requesting specific MBMS data, than to perform SFN operation and transmit MBMS data to all cells including a large number of cells where there are no receiving terminals. FIG. 13 shows this situation.

The SFN area shown in FIG. 13 is the unit of performing SFN operation, and identical information is transmitted at the same timings in the same frequency in all cells in this range. By this means, as long as terminals are located in cell edge in this SFN area, signals are combined between base stations over the radio. This figure shows a case where terminals requesting specific MBMS data are located only in three cells. In this case, it is useless to transmit MBMS data in cells other than the above three cells, and so it is possible to transmit MBMS data in the above three cells.

However, to detect that there are terminals requesting specific MBMS data in three cells alone, it is necessary to use existing counting in locations where the terminals request the specific MBMS data. This counting command can be in common between cells, so that it is possible to adopt SFN operation.

In this way, it is possible behaviors that an MBMS control step starts in SFN operation and finally ends in non-SFN operation. FIG. 14 shows examples of these MBMS control steps. In FIGS. 14A to 14H, the MBMS control steps are the same, and differ in whether SFN operation or non-SFN operation is performed for individual messages. Hereinafter, specific MBMS control steps will be shown.

In ST 301, the base station notifies terminals to start a service, and, in ST 302, the base station transmits a notification message including information showing what service starts from the base station to terminals.

In ST 303, the base station provides information on using counting for terminals by transmitting access information, and, in ST 304, the terminals report a counting result by transmitting a counting response to the base station.

In ST 305, the base station reports RB information transmitting the MTCHs to the terminals by transmitting RB information, and, in ST 306, the base station actually transmits data to the terminals by the MTCH.

In the process of these MBMS control steps, it is possible to transmit messages by MCHs or DL SCHs. For example, FIG. 14A shows the MBMS control steps where all messages are transmitted by MCHs, and FIG. 14C shows the MBMS control steps of transmitting the messages from ST 301 to ST 303 by MCHs, and, upon determining non-SFN operation as a counting response result, transmitting the messages in ST 305 and ST 306 by DL-SCHs of non-SFN operation.

Further, by contrast with the MBMS control steps shown in FIG. 14C, FIG. 14G shows the MBMS control steps of transmitting the messages from ST 301 to ST 303 by DL-SCHs, and, upon determining non-SFN operation from a counting response result, transmitting the messages in ST 305 and ST 306 by MCHs of SFN operation.

However, there is the following problem when SFN operation and non-SFN operation are switched. That is, when switching is made between operating individual services in SFN operation and operating individual services in non-SFN operation, it is necessary for the terminals to receive both messages. To be more specific, as shown in FIG. 14C, from the RB information in ST 305, the service is switched to DL-SCH of non-SFN operation. For this reason, the terminals need to identify the RB information in ST 305 as non-SFN operation use and need to support this switching.

Figures 15A, 15B:
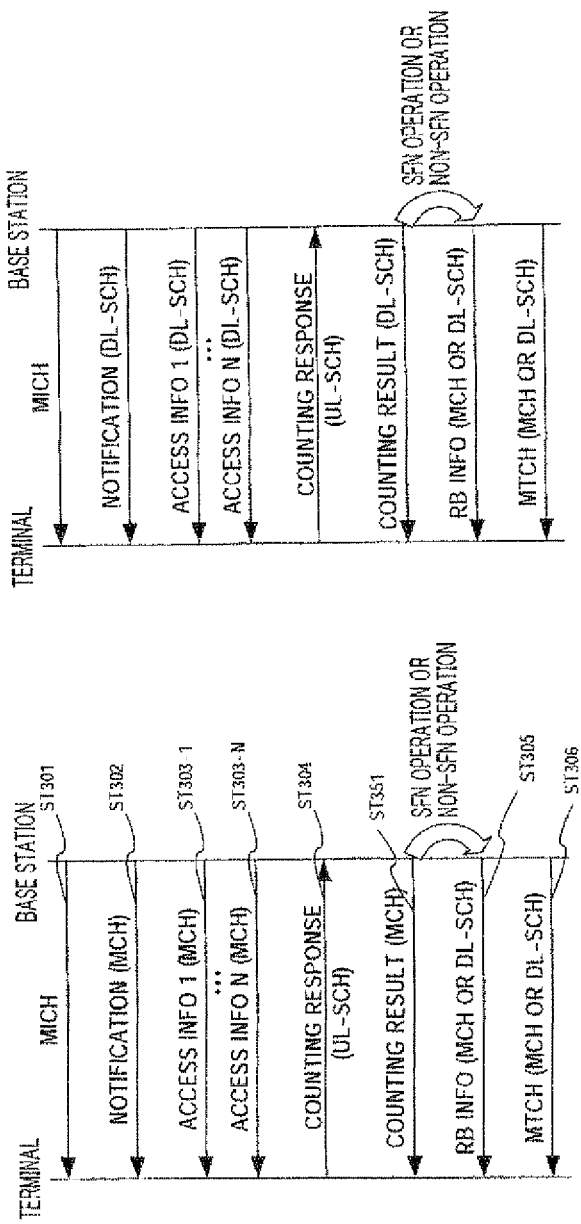
FIG. 15 illustrates to be used to define a counting result.

Amongst all patterns shown in FIG. 14, FIGS. 14C and 14G show MBMS control steps of switching between SFN operation and non-SFN operation when SFN operation or not is determined based on the counting result. For this reason, a message reporting a counting result is defined as the counting result in ST 351 as shown in FIG. 15. Here, the counting result is transmitted in the same channel as a channel in the above MBMS control steps, that is, MCHs or DL-SCHs. As in a case shown in FIG. 15A, the messages from ST 301 to ST 303 are transmitted by MCHs. For this reason, the counting result in ST 351 is transmitted by the MCHs, thereby reporting whether the messages in ST 305 and ST 306 are the MCHs or DL-SCHs. As in a case shown in FIG. 15B, messages from ST 301 to ST 303 are transmitted by DL-SCHs. For this reason, the counting result in ST 351 is transmitted by the DL-SCHs, thereby reporting whether the messages in ST 305 and ST 306 are the MCHs or DL-SCHs.

Figure 16:
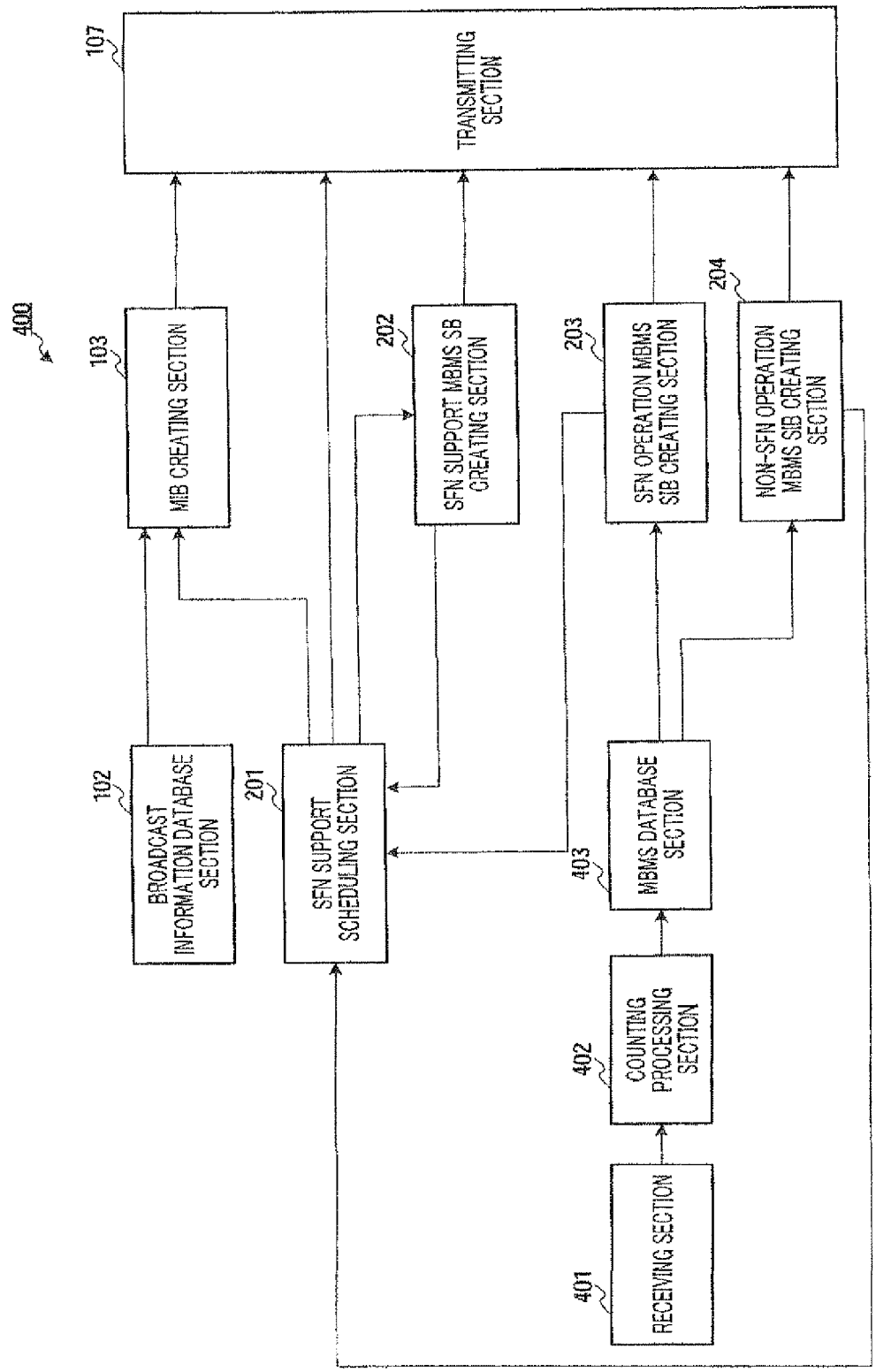
FIG. 16 is a block diagram showing the configuration of the base station according to Embodiment 3 of the present invention.

FIG. 16 is a block diagram showing the configuration of base station 400 according to Embodiment 3 of the present invention. FIG. 16 differs from FIG. 12 in adding receiving section 401 and counting processing section 402 and in changing MBMS database section 105 to MBMS database section 403.

Receiving section 401 receives signals transmitted from a plurality of terminals, and outputs the received signals to counting processing section 402.

Counting processing section 402 performs counting on the signals outputted from receiving section 401, and outputs the counting result to MBMS database section 403.

Based on the counting result outputted from counting processing section 402, MBMS database section 403 as a message creating means determines whether or not to adopt SFN operation to control information for specific MBMS data.

MBMS database section 403 outputs this determination result as a counting result to SFN operation MBMS SIB creating section 203 or non-SFN operation MBMS SIB creating section 204.

Here, the operations of base station 400 shown in FIG. 16 will be explained based on the MBMS control steps shown in FIG. 15A. First, the notification in ST 301 and the access information in ST 302 are transmitted in the MCHs, so that information using for creating corresponding SIBs is outputted from MBMS database section 403 to SFN operation MBMS SIB creating section 203.

SFN operation MBMS SIB creating section 203 creates an SIB using the information outputted from MBMS database section 403, and outputs the information showing the created SIB to SFN support scheduling section 201 and the SIB itself to transmitting section 107. Hereinafter, transmitting processing of the notification in ST 301 and the access information in ST 302 is the same as in Embodiment 2, and the description thereof in detail will be omitted.

Receiving section 401 receives the counting response in ST 304, and outputs the received counting response to counting processing section 402. Based on the counting response outputted from receiving section 401, counting processing section 402 determines whether or not to provide this service in the cell, and determines whether or not to perform SFN operation if providing this service. The determination result is outputted to MBMS database section 403.

Based on the determination result outputted from counting processing section 402, MBMS database section 403 determines whether or not to transmit the RB information in ST 305 and the MTCHs in ST 306. If it is necessary to transmit them, MBMS database section 403 determines whether or not to perform SFN operation.

Then, MBMS database section 403 outputs the result as the counting result in ST 351 to SFN operation MBMS SIB creating section 203 or non-SFN operation MBMS SIB creating section 204. However, if the access information in ST 303 is transmitted in SFN operation, the counting result is outputted to SFN operation MBMS SIB creating section 203, and, if the access information in ST 303 is transmitted in non-SFN operation, the counting result is outputted to non-SFN operation MBMS SIB creating section 204

Further, if MBMS database section 403 determines to perform SFN operation, the content of RB information in ST 303 is outputted to SFN operation MBMS SIB creating section 203, and, if MBMS database section 403 determines to perform non-SFN operation, the content of RB information in ST 303 is outputted to non-SFN operation MBMS SIB creating section 204. In FIG. 14C, non-SFN operation is determined to be performed, so that, the content of RB information is outputted to non-SFN operation MBMS SIB creating section 204. The behaviors after this are the same as the existing behaviors and the behaviors in Embodiment 2.

Figure 17:
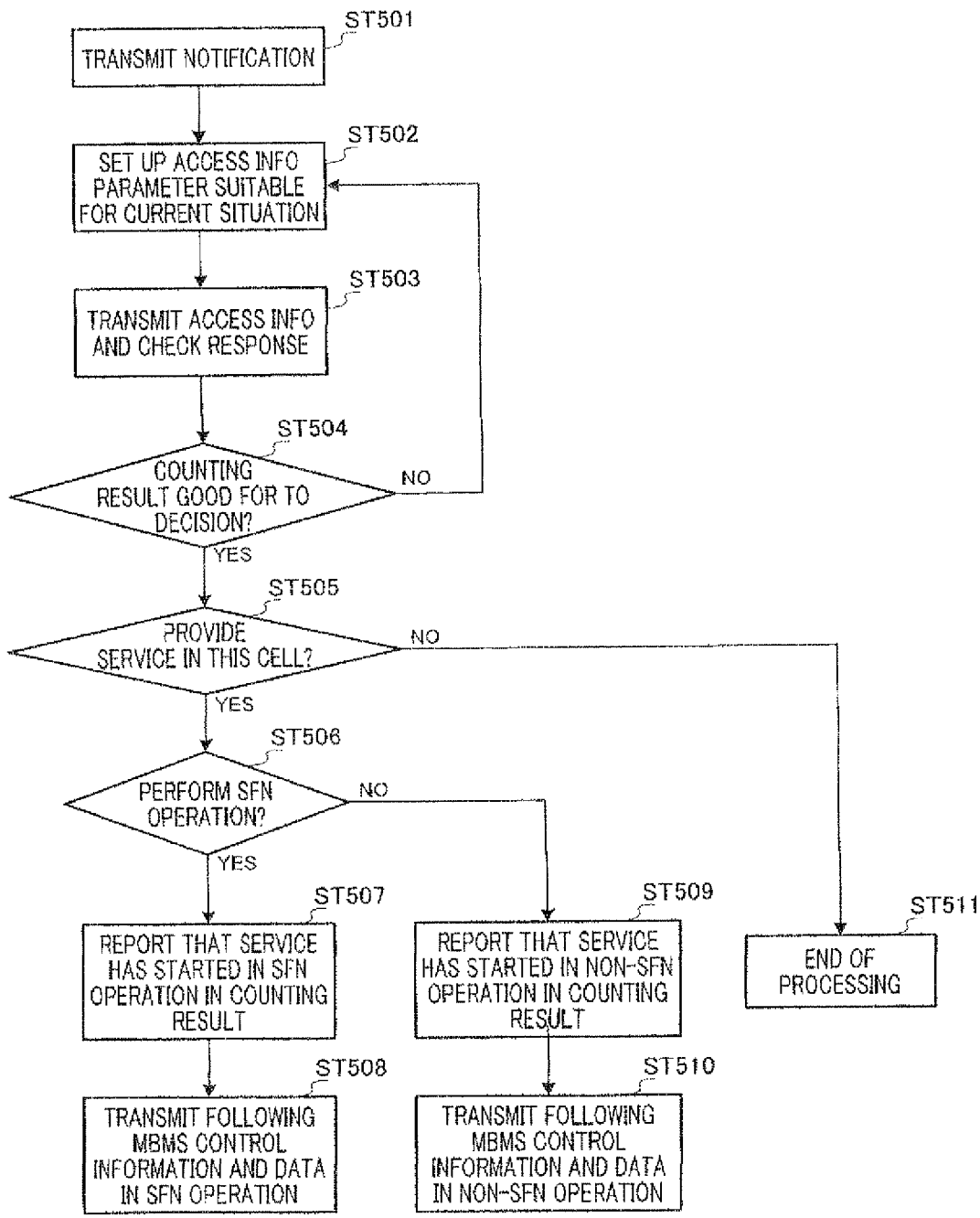
FIG. 17 is a flowchart showing the operations of the base station shown in FIG. 12.

FIG. 17 shows a flowchart of the operations of above-described base station 400. Referring to this figure, a notification is transmitted in ST 501, and, in ST 502, parameters set up for the access information are determined. To be more specific, in a case where access information has already been transmitted, the parameters are determined such that the terminals returning responses more increase.

In ST 503, the access information is transmitted and the response of the result is checked. In ST 504, determination is carried out whether or not the counting result is adequate for determining whether or not to carry out transmission and whether or not SFN operation. If the counting result is adequate, the step moves to ST 505, and if it is not good, the step returns to ST 502.

In ST 505, whether or not to provide the service in this cell is determined from the counting result. If the service is provided, the step moves to ST 506 and, if the service is not provided, the step moves to ST 511 and the processing is finished. In ST 506, whether or not to perform SFN operation is determined. The step moves to ST 507 if SFN operation is performed, and the step moves to ST 509 if SFN operation is not performed.

In ST 507, starting the service in SFN operation is reported to the terminal in the counting result, and, in ST 508, the subsequent MBMS control information and data are controlled so as to be transmitted in SFN operation.

In ST 509, base station 400 reports the terminals to start the service in non-SFN operation in the counting result, and, in ST 510, controls the subsequent MBMS control information and data so as to transmit the information and data in non-SFN operation.

These behaviors make it possible to switch between SFN operation and non-SFN operation. Here, these are behaviors for one service and are not behaviors for the entire MBMS.

Figure 18:
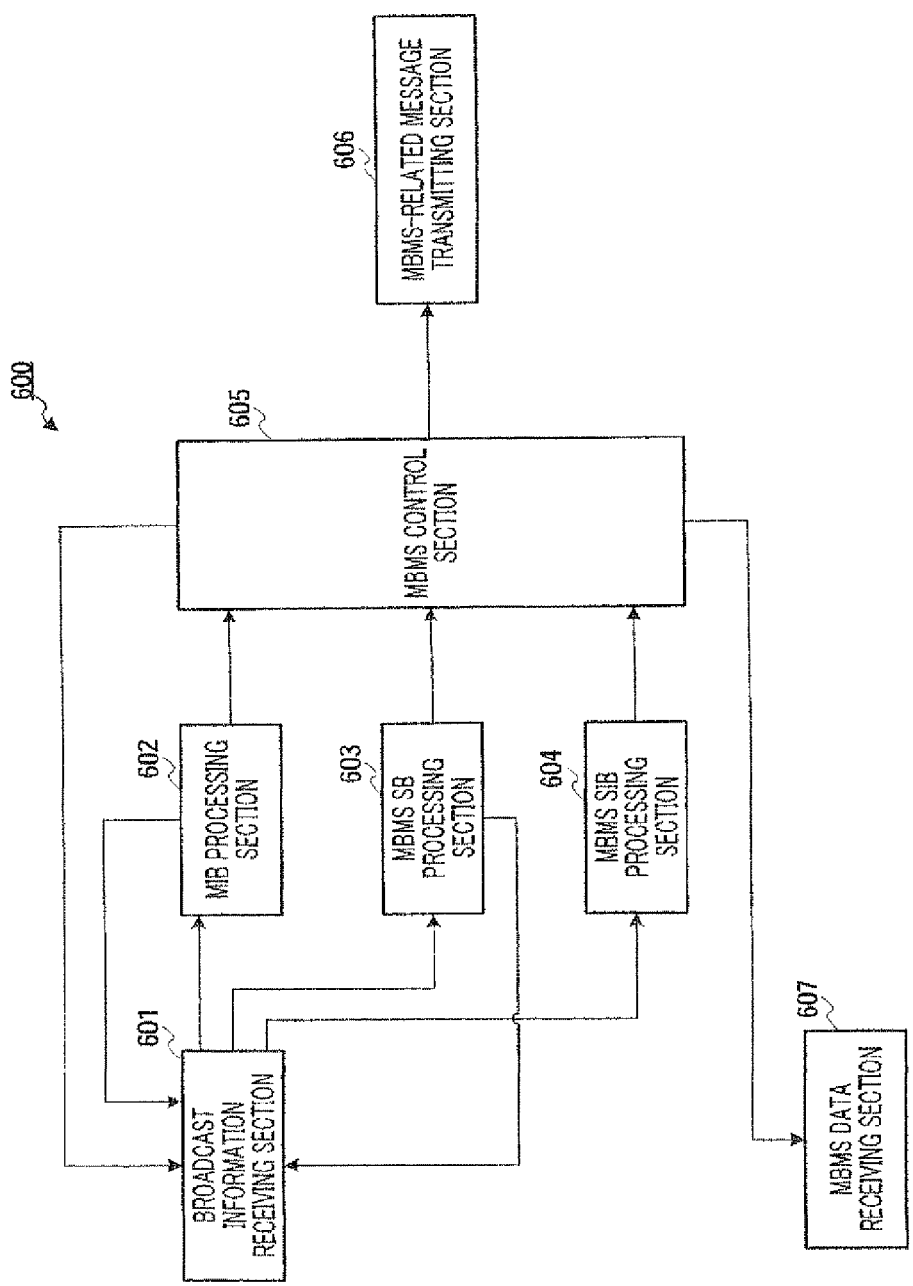
FIG. 18 is a block diagram showing the configuration of the terminal according to Embodiment 3 of the present invention.

FIG. 18 is a block diagram showing the configuration of terminal 600 according to Embodiment 3 of the present invention. Referring to FIG. 18, broadcast information receiving section 601 receives broadcast information transmitted from base station 400, and, based on information outputted from MIB processing section 602, MBMS SB processing section 603 and MBMS control section 605 (described later), outputs MIBs included in the received broadcast information to MIB processing section 602, outputs MBMS SBs included in the received broadcast information to MBMS SB processing section 603, and outputs MBMS SIBs to MBMS SIB processing section 604. Here, the broadcast information includes MIBs, MBMS SBs and MBMS SIBs.

Based on the MIBs outputted from broadcast information receiving section 601, MIB processing section 602 acquires MBMS SB scheduling information, reports the acquiring the MBMS SB scheduling information to MBMS control section 605 and sets up the MBMS SB scheduling information in broadcast information receiving section 601.

MBMS SB processing section 603 acquires MBMS SIB scheduling information outputted from broadcast information receiving section 601, and, reports the acquired MBMS SIB scheduling information to MBMS control section 605 and sets up the MBMS SIB scheduling information in broadcast information receiving section 601.

MBMS SIB processing section 604 processes the MBMS SIBs outputted from broadcast information receiving section 601 and reports the MBMS SIBs after processing to MBMS control section 605.

MBMS control section 605 controls MBMS based on the information outputted from MIB processing section 602, MBMS SB processing section 603, MBMS SIB processing section 604. Based on this control result, MBMS control section 605 commands broadcast information receiving section 601 to receive MBMS SBs and MBMS SIBs and commands MBMS data receiving section 607 to receive MBMS data. Further, if MBMS control section 605 needs to return a response by counting and so on, MBMS control section 605 creates a response and transmit the created response to MBMS-related message transmitting section 606.

MBMS-related message transmitting section 606 transmits an MBMS uplink signal including the counting response outputted from MBMS control section 605, to base station 400.

According to the command to receive MBMS data outputted from MBMS control section 605, MBMS data receiving section 607 receives MBMS data transmitted from base station 400.

By this configuration, terminal 600 can receive

MBMS control information as broadcast information in broadcast information receiving section 601, and can perform processing on an MBMS SIB, which is MBMS control information, in MBMS SIB processing section 604.

Here, as an example where operation of a piece of MBMS data differs between SFN operation and non-SFN operation, it is possible to perform counting processing alone in cell units. That is, the counting processing is performed upon receiving responses from terminals on a per cell basis, so that, terminals are detected immediately by counting in one cell, or terminals are not easily detected by counting in another cell. By this means, it is possible to perform counting processing on a per cell basis. In counting processing, it is necessary to adjust probability factors such that terminals 600 in adequate number return responses. It is possible that this processing is different between base stations. FIG. 19 shows this situation.

Figures 19A, 19B, 19C:
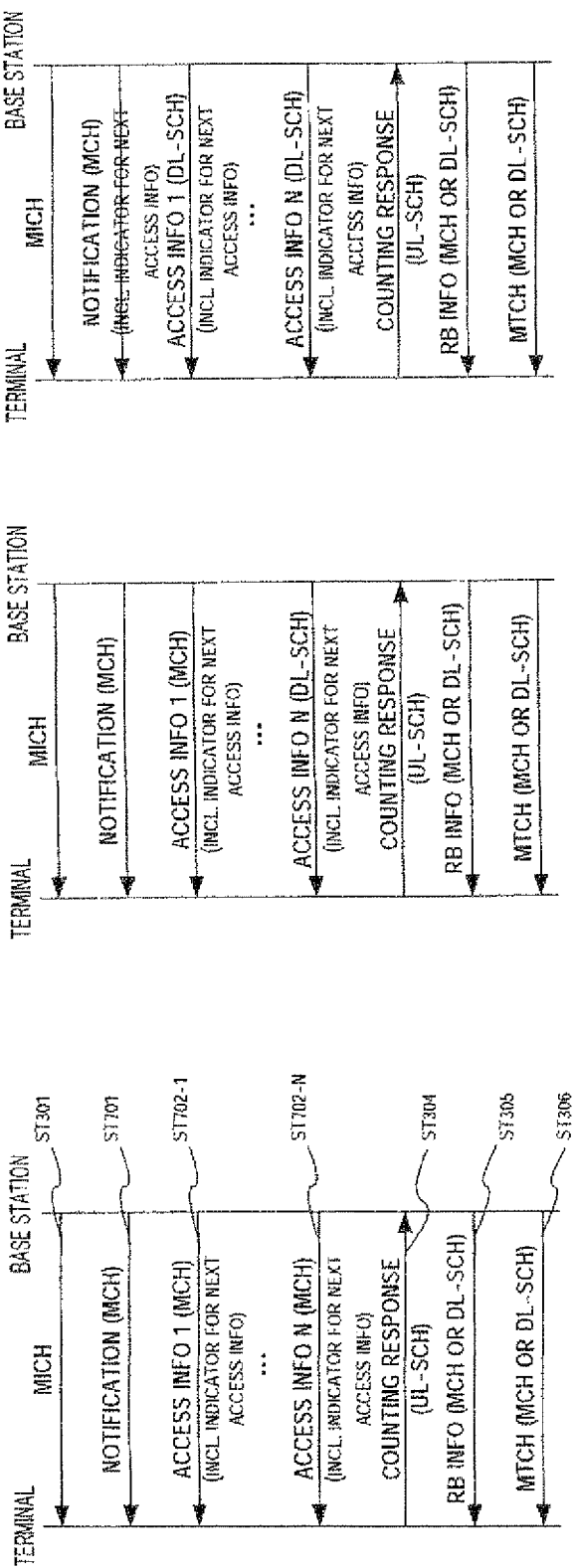
FIG. 19 explains probability factor adjustments.

FIG. 19A shows a case where the messages for the counting are usually transmitted in the MCHs. By contrast with this, in FIG. 19B, the messages for the counting are changed from the MCHs to the DL-SCHs. This refers to a case where all same setups are first started in an SFN area yet needs to be changed in the middle of the processing. To support these behaviors, it is possible to show whether to transmit the next access information in an MCH or in a DL-SCH, in a message of access information in ST **702-*n*** (1≤n≤N−1).

In FIG. 19C, the access information is transmitted in the DL-SCHs from the beginning. In this case, it is necessary to show in the notification in ST 701 that the access information is transmitted by the DL-SCHs. This behavior may also be available in the configuration shown in FIG. 16. To be more specific, based on the result from counting processing section 402, MBMS database section 403 adds information as to access information is (ST 702-1 to ST 702-N) transmitted in SFN operation or not, as information of past messages (notification (ST 701) to access information (ST 702)).

These behaviors are required in the situation shown in FIG. 13. That is, in usual SFN operation, the base station first determines whether or not to transmit data in all cells in the SFN area, and, when the base station determines not to perform SFN operation, determines whether or not it is necessary to provide a service in each cell. It is possible at this time to transmit data using different probability factors between the cells where terminals are detected earlier and the cells where terminals are detected later. By this means, it is possible to restrict transmission from terminals not requesting the service in the cells detected earlier.

Figure 20:
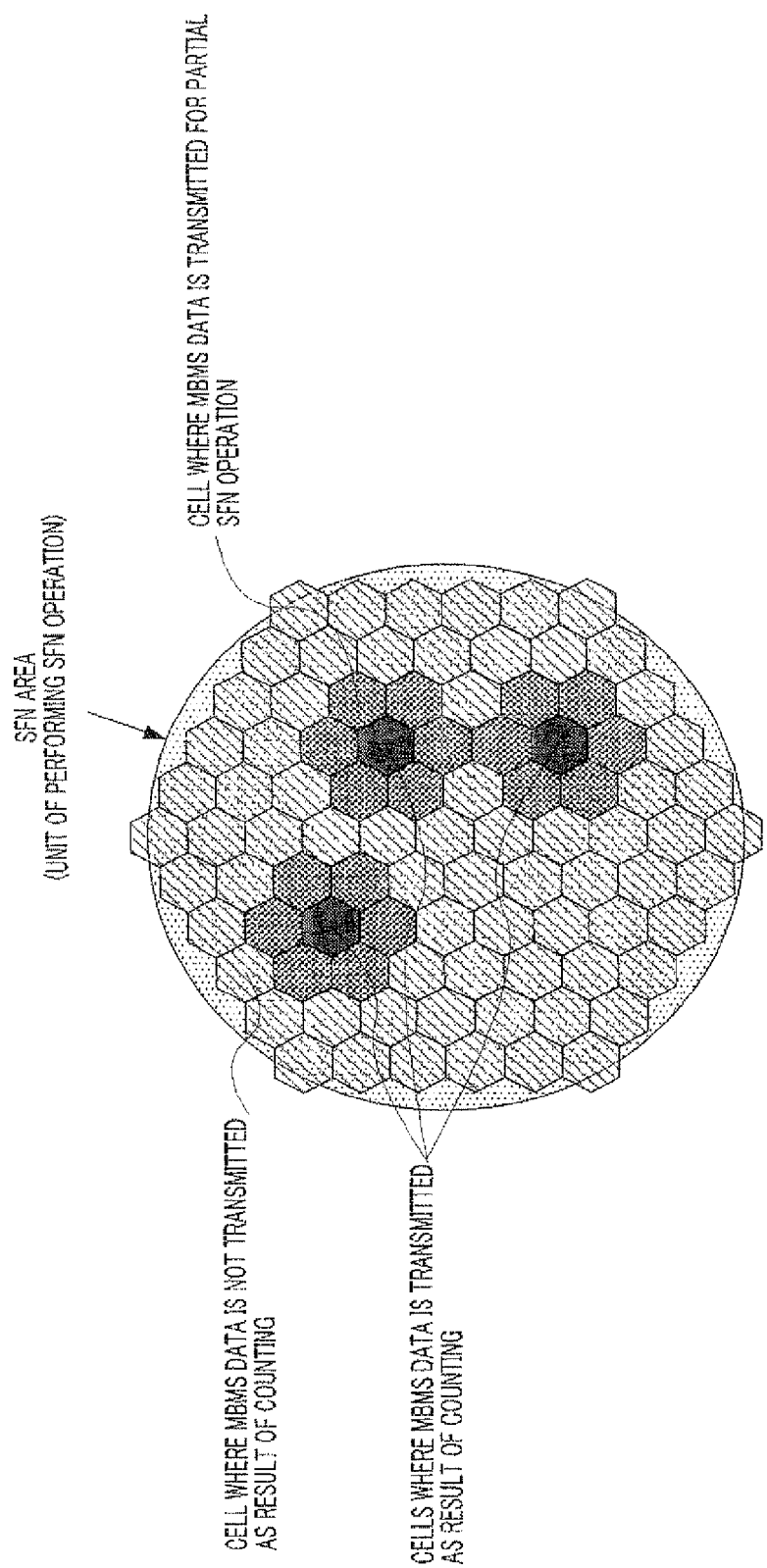
FIG. 20 shows how to perform partial SFN operation.

It is possible that these behaviors are required to perform partial SFN operation as shown in FIG. 20. In this case, in addition to the behaviors in FIG. 13, it is possible that, as a counting result, the base station transmits MBMS data to neighboring cells of the cells where terminals are detected, and performs partial SFN operation. In this case, it is possible to use different probability factors among the cells where terminals are detected, their neighboring cells, and the cells where terminals are not detected.

In this way, according to Embodiment 3, when SFN operation and non-SFN operation are switched in the middle of MBMS control steps, by including information of designating switching in a counting result for reporting terminals, both a message adopting SFN operation and a message adopting non-SFN operation are not required to be transmitted and it is possible to conduct MBMS control steps efficiently.

Although examples of the timing to return the counting response after the access information (ST 303-N) is finished have been shown in FIGS. 14, 15 and 19 with the present embodiment, depending on the result of the counting steps by the terminals, the counting response may be returned from ST 303-1 to ST 303-N, and may be returned at any timings.

Further, although a case has been explained with the present embodiment as shown in FIGS. 14, 15 and 19 where notification refers to one message and RB information refers to one message, they may be operated as a plurality of messages (or SIBs) as shown in UMTS shown in the conventional case.

Further, the behaviors of terminals described in FIG. 18 may be implemented as the behaviors of terminals that receive signals from the base station supported in Embodiments 1 and 2.

(Embodiment 4)

Figure 21:
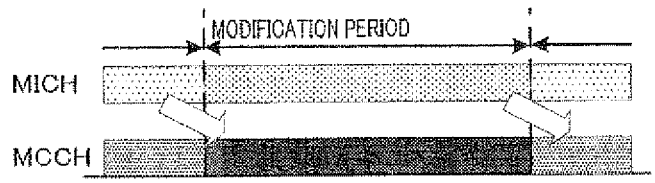
FIG. 21 shows how to command to receive MCCHs by MICH.

In UMTS, an MBMS Indication Channel (MICH) is defined, whereby the base station can command terminals to receive the MCCHs. Specifically, FIG. 21 shows the behaviors such that the MICH is urged to receive MCCH notification messages (MBMS modified services information and MBMS unmodified services information) from the beginning of the next modification period. Further, in the MICH, a command is given to terminals using an ID grouping a plurality of services here. For that reason, the command may not be the service that the terminal would actually like to receive. That is, the terminal checks content of the notification and finally determines whether or not there is a service the terminal would like to receive.

Figure 22:
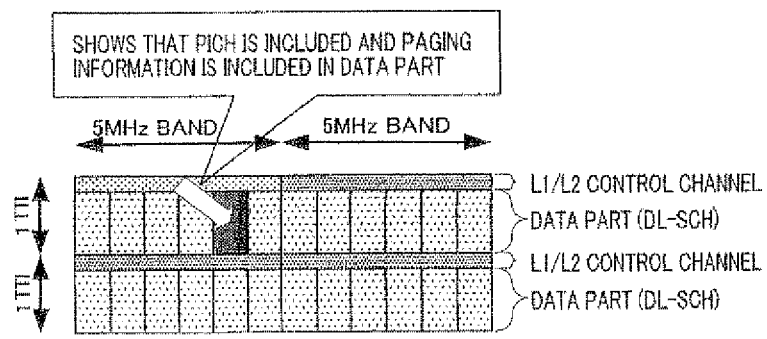
FIG. 22 shows the concept of the PICH in LTE.

This behavior of the MICH is close to the concept of a paging indicator channel (i.e. PICH) that reports a normal call in UMTS. For that reason, it is possible that this behavior is also close to the concept of the PICH in LTE. FIG. 22 shows the concept of the PICH in LTE. As shown here, the PICH is transmitted in an L1/L2 control channel showing what information is transmitted and how in the data part. By acquiring this PICH, terminals can identify that the paging information is included. Taking into account an MICH as in these behaviors, the behaviors such that the MICH is transmitted in the L1/L2 control channel and a notification is transmitted in the data part are possible.

However, as shown in Embodiment 2, it is possible that there are notifications for performing SFN operation and notifications for performing non-SFN operation, so that it is necessary to transmit respective notifications at different timings. For that reason, two types of the MICHs need to be prepared and the terminals also have to wait to receive both MICHs. This result causes the terminals to take a long time to receive, and therefore, power consumption increases. Further, when the concept of the modification period is introduced also in LTE, it is possible to use the different repetition periods between SFN operation and non-SFN operation. For that reason, even in this case two types of the MICHs are required.

Figure 23:
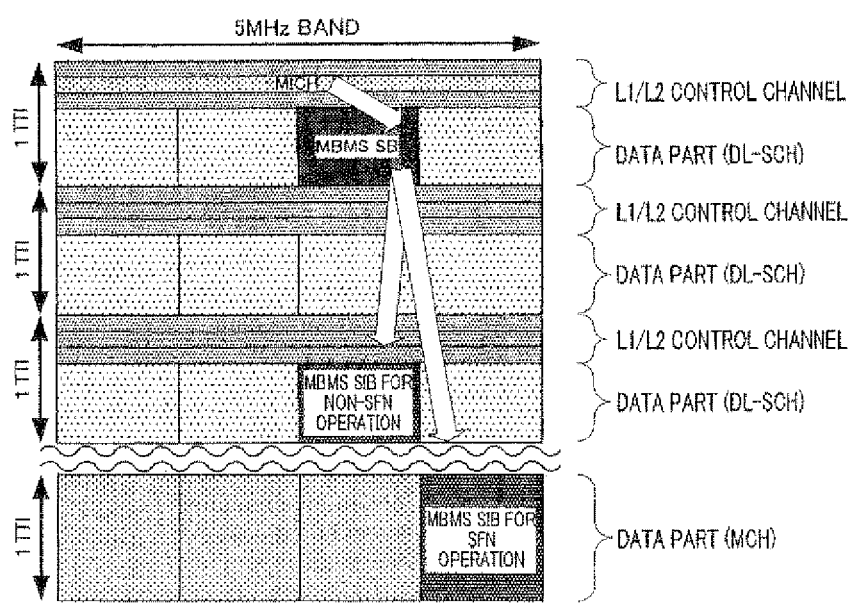
FIG. 23 shows the situation where MICHs are defined for the MBMS SB.

Then, it is possible not to define the MICH for a notification, but to define the MICH for an MBMS SB. FIG. 23 shows this conceptual diagram. As shown in FIG. 23, the MICHs are transmitted in the same subframe (or slot or TTI (Transmission Time Interval)) as the MBMS SBs are transmitted. By this means, the terminals may only check the L1/L2 control channel of the TTI and do not need to wait to receive a plurality of notifications. Further, as shown in FIG. 23, it is also possible that there is not L1/L2 control information in the subframe (slot or TTI) transmitting the MCH. This is because, in MBMS, transmission is carried out in fixed resources to a certain extent and it is not a kind of scheduling flexibly in the time and frequency domain. Even in this case, it is efficient to specify the MICHs for the MBMS SBs.

Figure 24:
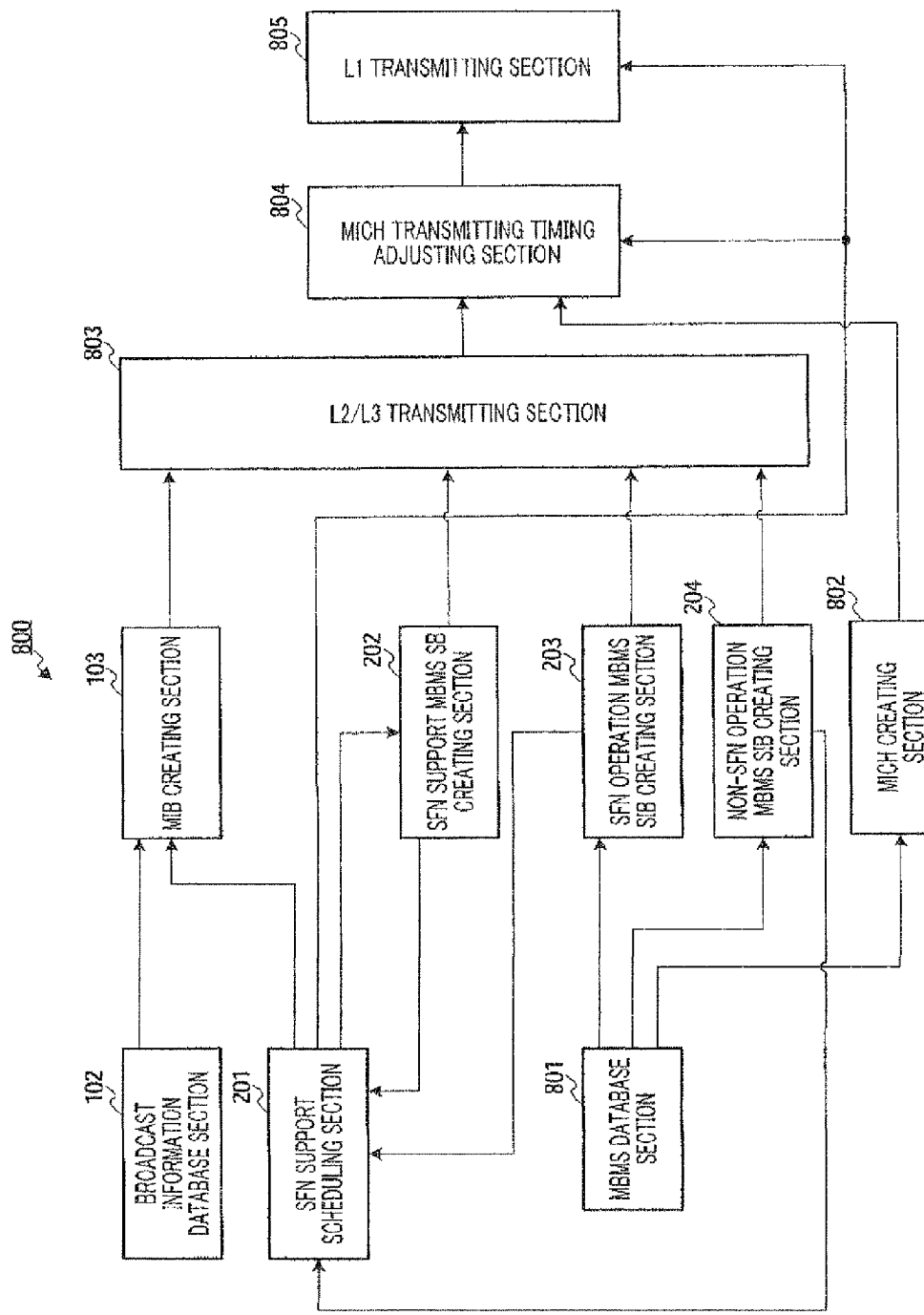
FIG. 24 is a block diagram showing the configuration of the base station according to Embodiment 4 of the present invention.

FIG. 24 is a block diagram showing the configuration of base station 800 according to Embodiment 4 of the present invention. FIG. 24 differs from FIG. 12 in adding MICH creating section 802 and MICH transmitting timing adjusting section 804, in changing MBMS database section 105 to MBMS database section 801, in deleting transmitting section 107, and in adding L3/L2 transmitting section 803 and L1 transmitting section 805.

MBMS database section 801 outputs service information and setup information to SFN operation MBMS SIB creating section 203 and non-SFN operation MBMS SIB creating section 204, and outputs information for creating the MICH to MICH creating section 802.

MICH creating section 802 creates an MICH based on the information outputted from MBMS database section 801, and outputs the created MICH to MICH transmitting timing adjusting section 804.

L3/L2 transmitting section 803 transmits the MIB outputted from MIB creating section 103, the MBMS SB outputted from SFN support MBMS SB creating section 202 and the MBMS SIB for SFN operation outputted from SFN operation MBMS SIB creating section 203, from layer 3 and layer 2 levels to the lower layers, and outputs them to MICH transmitting timing adjusting section 804.

Based on the scheduling information outputted from SFN support scheduling section 201, MICH transmitting timing adjusting section 804 adjusts the MICH transmission timing so as to transmit the MICH outputted from MICH creating section 802 in L1/L2 control channel in the sub-frame where the MBMS SB outputted from L3/L2 transmitting section 803 is transmitted, and outputs the MICH adjusted transmission timing to L1 transmitting section 805.

Based on the scheduling information outputted from SFN support scheduling section 201, L1 transmitting section 805 transmits the MICH outputted from MICH transmission timing adjusting section 804 in the layer 1 level.

Here, the behaviors of base station 800 shown in FIG. 24 will be explained. Upon starting a new service, MBMS database section 801 reports the service information to MICH creating section 802.

MICH creating section 802 creates content to be transmitted as the MICH based on the information acquired from MBMS database section 801. To be more specific, MICH creating section 802 creates command information for designating the new service to be started. Further, this information is outputted to MICH transmission timing adjusting section 804.

Figure 25:
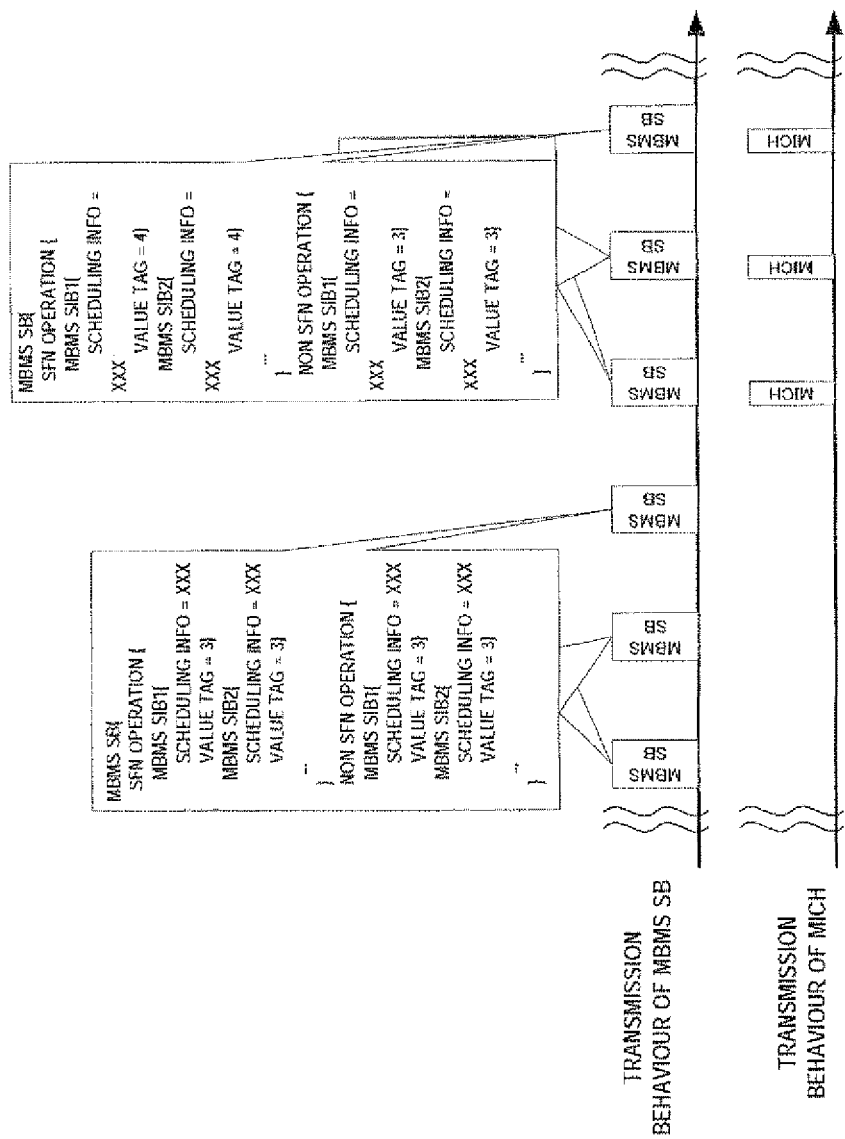
FIG. 25 shows the situation of transmitting the MICHs from the first MBMS SB where value tags are updated.

MICH transmission timing adjusting section 804 adjusts the transmission timings of the MBMS SBs and the MICHs to be the same. At this time, it is not only to simply transmit the MBMS SBs and the MICHs at the same timings, and it is necessary to take into account the control information transmission timing for providing the new service. To fulfill the same role as the modification period in UMTS as shown in Embodiment 1, it is possible to adopt the update of value tags or adopt the modification period. In the former case, it is necessary to transmit MICHs from the first MBMS SB in which the value tags are updated for control information by transmitting information for the new service. FIG. 25 shows an example of these behaviors.

The MICH transmission starts from the timing when the value tags are updated as such. Moreover, an example of update of the value tags only for SFN operation-related control information has been shown this case. If terminals follow the update of value tags, the behavior so as to check only these updated value tags is also possible. If the modification period itself is used, it is necessary to transmit the MICHs from the first MBMS SB in the modification period. At this time, it is necessary to take into account of using different modification periods between SFN operation and non-SFN operation as described before. For this reason, it is possible that, in the case of SFN operation, the base station transmits a MICH for the head MBMS SB in the modification period in SFN operation, and, in the case of non-SFN operation, the base station transmits a MICH for the head MBMS SB in the modification period in non-SFN operation. Here, although a case has been taken into account where MICHs are transmitted for MBMS SBs in the modification period when the content of notification is changed, if the MBMS SBs are early updated in the previous modification period, the MICHs are transmitted for the MBMS SBs in the previous modification period.

As the above-described behaviors, it is possible for the terminals to wait to receive both MBMS data subjected to SFN operation and MBMS data subjected to non-SFN operation using one MICH.

Figure 26:
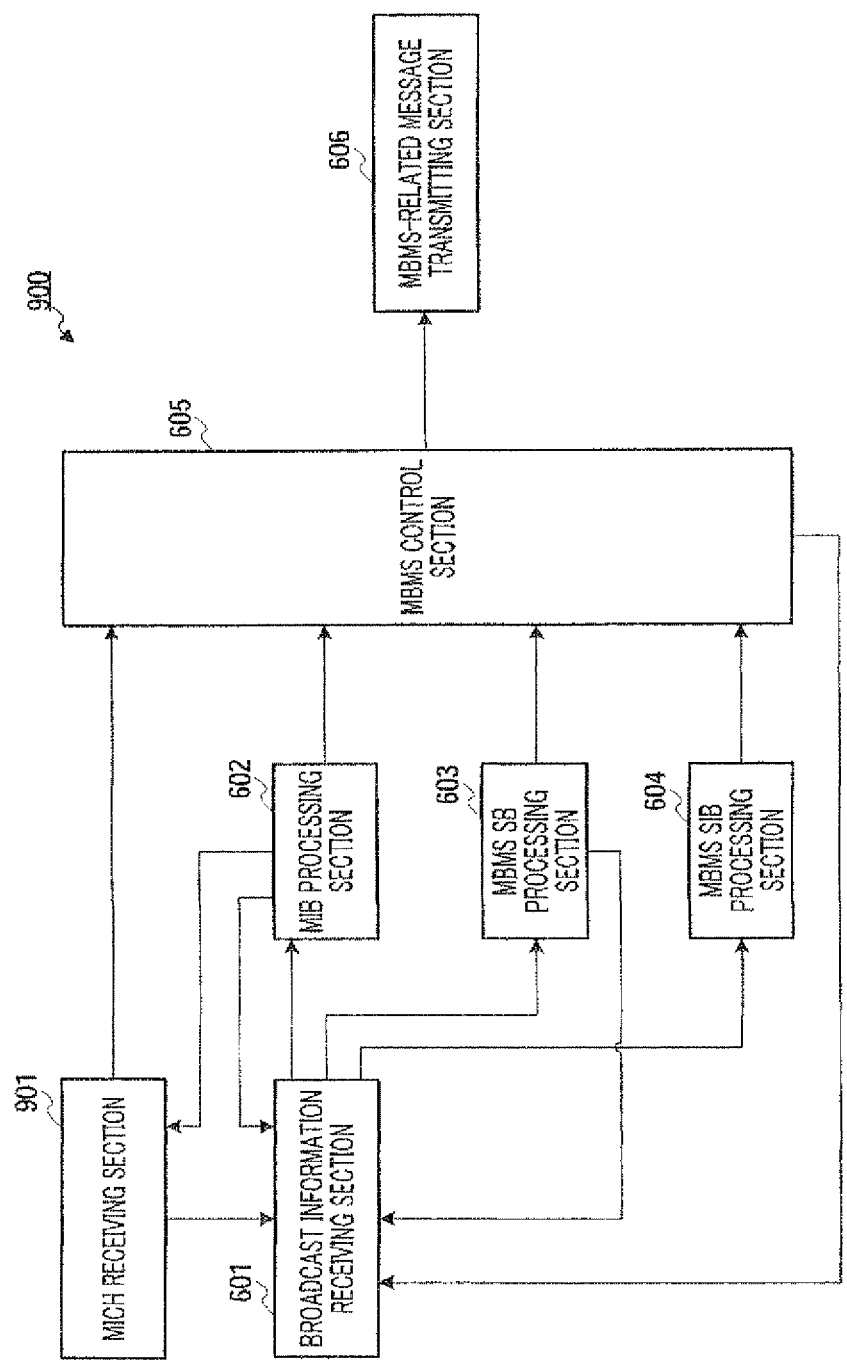
FIG. 26 is a block diagram showing the configuration of the terminal according to Embodiment 4 of the present invention.

FIG. 26 is a block diagram showing the configuration of terminal 900 according to Embodiment 4 of the present invention. FIG. 26 differs from FIG. 18 in adding MICH receiving section 901.

MICH receiving section 901 receives an MICH based on the HEMS SB scheduling information outputted from MIB processing section 602. The received MICH is outputted to MBMS controlling section 605 and broadcast information receiving section 601. That is, when MBMS SBs are received based on the MICH, MBMS SB receiving processing is performed in broadcast information receiving section 601 based on the information from MICH receiving section 901. Further, when an MBMS SIB notifications are received based on this MICH, MBMS SIB receiving processing is performed in broadcast information receiving section 601 based on the information from MBMS controlling section 605.

These configurations make it possible to receive MBMS SBs or MBMS SIBs according to an MICH.

In this way, according to Embodiment 4, by transmitting MBMS SBs and MICHs in the same transmission unit including a TTI or a slot, it is possible for the terminals to wait to receive both MBMS data subjected to SFN operation and MBMS data subjected to non-SFN operation using one MICH and shorten the time for waiting to receive the MBMS data by the terminals, thereby reducing power consumption.

Figure 27:
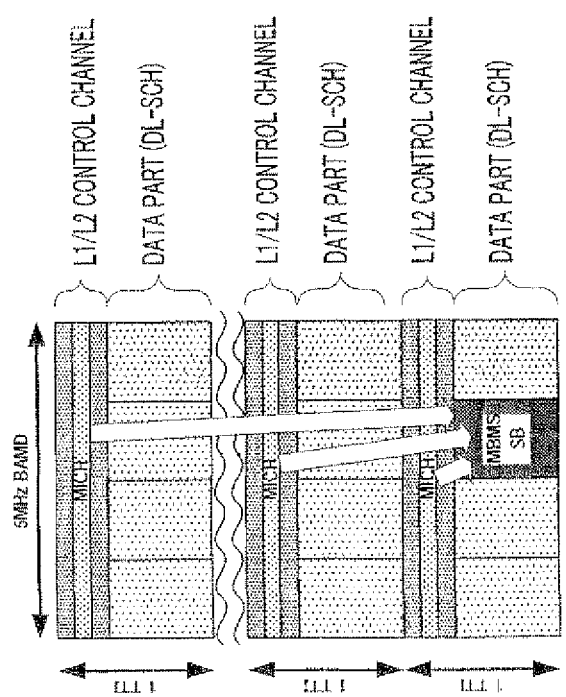
FIG. 27 shows the situation of transmitting MICHs prior to several subframes of MBMS SB transmission timing.

With the present embodiment, a case has been shown that the MICHs are transmitted in L1/L2 control channel of the subframe (slot or TTI) where the MBMS SBs are transmitted. This may lead to transmit the MICHs from several subframes (slot or TTI) prior to the timing when the MBMS SBs are transmitted. These behaviors make it possible to prevent from failing to receive MICHs. FIG. 27 shows an example of these behaviors.

Further, with the present embodiment, the information designating the service included in the MICH has been shown. In addition to this, it is possible to include as the information in the MICH whether or not the notification for the service is subjected to SFN operation or non-SFN operation. In this case, the terminals know whether to check the notification of SFN operation or the notification of non-SFN operation, so that the terminals can check one of the notifications. Further, as described above, in UMTS, content designating an entire service is not transmitted in MICHs. Instead, information designating a service group is transmitted in MICHs. When this concept is used in LTE, it is possible to divide a group into a group performing notification in SFN operation and a group performing notification in non-SFN operation.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2006-294728, filed on Oct. 30, 2006, and Japanese Patent Application No. 2006-344925, filed on Dec. 21, 2006, including the specifications, drawings and abstracts, are incorporated herein by reference in their entirety.

INDUSTRIAL APPLICABILITY

The radio communication base station apparatus and the radio communication method according to present invention can reduce overhead in MBMS of LTE and are applicable to, for example, mobile communication systems.

The invention claimed is:
1. A radio communication base station apparatus, the base station apparatus being used in a system providing a multimedia broadcast multicast service (MBMS) with a different plurality of Single Frequency Network (SFN) operation formats per area, the base station apparatus comprising:
    an MBMS control information creator that creates MBMS control information per plurality of SFN operation formats as control information for the MBMS with the different plurality of SFN operation formats;
    a transmitter that transmits the created MBMS control information;
    a notification section that transmits (i) notification information to notify instructions to obtain the MBMS control information via a common Layer 1/Layer 2 (L1/L2) control channel in the plurality of SFN operation formats, and (ii) information on scheduling to obtain the MBMS control information; and
    an adjustor that adjusts a transmission timing of sending the notification information so that instructions to obtain the MBMS control information and the information on scheduling of the MBMS control information are in a same transmission unit.
2. The radio communication base station apparatus according to claim 1, wherein the notification information to obtain the MBMS control information includes a Scheduling Block (MBMS SB) for a common MBMS in the plurality of SFN operation formats and includes scheduling information of the MBMS control information.
3. The radio communication base station apparatus according to claim 1, wherein the plurality of SFN operation formats include an operation format where SFN is used and an operation format where SFN is not used (Non-SFN).

4. The radio communication base station apparatus according to claim 1, wherein the notification information includes instructions to obtain the MBMS control information through an MBMS Indication Channel (MICH).

5. The radio communication base station apparatus according to claim 1, wherein the MBMS control information comprises an MBMS System Information Block (SIB).

6. The radio communication base station apparatus according to claim 1, wherein the MBMS control information comprises an MBMS point-to-multipoint Control Channel (MCCH).

7. A radio communication method in a system providing a multimedia broadcast multicast service (MBMS) with a different plurality of Single Frequency Network (SFN) operation formats per area, the method being performed by a base station apparatus that performs operations of:

creating MBMS control information per plurality of SFN operation formats as control information for the MBMS with the different plurality of SFN operation formats;

transmitting, by a transmitter, the created MBMS control information;

transmitting (i) notification information to notify instructions to obtain the MBMS control information via a common Layer 1/Layer 2 (L1/L2) control channel in the plurality of SFN operation formats, and (ii) information on scheduling to obtain the MBMS control information; and adjusting a transmission timing of sending the notification information so that instructions to obtain the MBMS control information and the information on scheduling of the MBMS control information are in a same transmission unit.

8. The method according to claim 7, wherein the notification information to obtain the MBMS control information includes a Scheduling Block (MBMS SB) for a common MBMS in the plurality of SFN operation formats and includes scheduling information of the MBMS control information.

9. The method according to claim 7, wherein the plurality of SEN operation formats include an operation format where SFN is used and an operation format where SFN is not used (Non-SFN).

10. The method according to claim 7, wherein the notification information includes instructions to obtain the MBMS control information through an MBMS Indication Channel (MICH).

11. The method according to claim 7, wherein the MBMS control information comprises an MBMS System Information Block (SIB).

12. The method according to claim 7, wherein the MBMS control information comprises an MBMS point-to-multipoint Control Channel (MCCH).

* * * * *